US009534133B2

(12) United States Patent
Wright et al.

(10) Patent No.: US 9,534,133 B2
(45) Date of Patent: Jan. 3, 2017

(54) METHODS FOR PRODUCING AN AT LEAST PARTIALLY CURED LAYER

(71) Applicant: 3M INNOVATIVE PROPERTIES COMPANY, St. Paul, MN (US)

(72) Inventors: Robin E. Wright, Hudson, WI (US); Margaux B. Mitera, New Richmond, WI (US); Richard L. Walter, St. Paul, MN (US); Jayshree Seth, Woodbury, MN (US); Janet A. Venne, Roseville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/955,151

(22) Filed: Dec. 1, 2015

(65) Prior Publication Data

US 2016/0083613 A1 Mar. 24, 2016

Related U.S. Application Data

(62) Division of application No. 13/590,260, filed on Aug. 21, 2012.

(60) Provisional application No. 61/530,184, filed on Sep. 1, 2011.

(51) Int. Cl.
*C08F 2/46* (2006.01)
*C08F 2/50* (2006.01)
*C09D 133/14* (2006.01)
*C09J 7/02* (2006.01)
*B05D 3/06* (2006.01)
*C09D 183/06* (2006.01)
*D21H 19/10* (2006.01)
*D21H 25/08* (2006.01)
*B05D 5/08* (2006.01)
*C08G 77/20* (2006.01)

(52) U.S. Cl.
CPC .......... *C09D 133/14* (2013.01); *B05D 3/065* (2013.01); *C09D 183/06* (2013.01); *C09J 7/0228* (2013.01); *D21H 19/10* (2013.01); *D21H 25/08* (2013.01); *B05D 5/08* (2013.01); *B05D 2252/00* (2013.01); *C08G 77/20* (2013.01); *C09J 2205/31* (2013.01); *C09J 2483/005* (2013.01); *Y10T 428/1476* (2015.01)

(58) Field of Classification Search
CPC . C09J 7/0228; C09J 2205/31; C09J 2483/005; C09D 183/06; Y10T 428/1476; C08G 77/20; B05D 2/065; B05D 2252/00; B05D 5/08
USPC ................ 428/41.8; 427/515, 489
See application file for complete search history.

(56) References Cited

U.S. PATENT DOCUMENTS

| 4,379,201 | A | | 4/1983 | Heilmann et al. |
| 4,748,043 | A | | 5/1988 | Seaver et al. |
| 5,091,483 | A | | 2/1992 | Mazurek et al. |
| 5,108,782 | A | * | 4/1992 | Reed ............... C09J 7/0228 427/387 |
| 5,326,598 | A | | 7/1994 | Seaver et al. |
| 5,891,530 | A | * | 4/1999 | Wright ............. C08F 290/06 427/208.4 |
| 6,224,949 | B1 | | 5/2001 | Wright et al. |
| 2003/0173545 | A1 | | 9/2003 | Hino et al. |
| 2007/0247711 | A1 | | 10/2007 | Ohtani et al. |
| 2010/0147457 | A1 | | 6/2010 | Mirou |
| 2011/0220268 | A1 | | 9/2011 | Nishio et al. |

FOREIGN PATENT DOCUMENTS

| CN | 101365545 A | 2/2009 |
| CN | 101965230 A | 2/2011 |
| EP | 1 471 078 | 10/2004 |
| EP | 1 772 479 | 4/2007 |
| EP | 2 198 981 | 6/2010 |
| JP | 1993-230436 A | 9/1993 |
| WO | WO 97/39837 | 10/1997 |
| WO | WO 99/64472 | 12/1999 |
| WO | WO 2010/061782 | 6/2010 |

OTHER PUBLICATIONS

Scherzer npl, Direct initiation of the photopolymerization of acrylates by short-wavelength excimer UV radiation, 2003, Nuclear Instruments and Methods in Physics Reserach B 208, 271-276.*
Jacobine et al., "Photo(co)polymerizable Silicone Monomers, Oligomers, and Resins", *Radiation Curing Science and Technology*, Chapter 5, Ed., S. Peter Pappas, Plenum Press, New York, (1992), pp. 200-214.
Cefalas et al., "Absorbance and outgasing of photoresist polymeric materials for UV lithography below 193 nm including 157 nm lithography", *Microelectronic Engineering*, 53, (2000), pp. 123-126.

(Continued)

*Primary Examiner* — Ling Choi
*Assistant Examiner* — Jessica E Whiteley
(74) *Attorney, Agent, or Firm* — James A. Baker

(57) ABSTRACT

Methods for producing an at least partially cured layer by applying a layer including a (meth)acrylate-functional siloxane to a surface of a substrate, and irradiating the layer in a substantially inert atmosphere with a short wavelength polychromatic ultraviolet light source having a peak intensity at a wavelength of from about 160 nanometers to about 240 nanometers to at least partially cure the layer. Optionally, the layer is at a curing temperature greater than 25° C. In some embodiments, the layer has a thickness of about 0.1 micrometers to about 1 micrometer. In certain embodiments, the layer is substantially free of a photoinitiator and/or an organic solvent. In some particular embodiments, irradiating the layer with a short wavelength polychromatic ultraviolet light source takes place in an inert atmosphere including no greater than 50 ppm oxygen. The substantially cured layer may be a release layer or a low adhesion backsize (LAB).

16 Claims, 1 Drawing Sheet

(56) References Cited

OTHER PUBLICATIONS

Scherzer et al., "Direct initiation of the photopolymerization of acrylates by short-wavelength excimer UV radiation", *Nuclear Instruments and Methods in Physics Research B*, 208, (2003), pp. 271-276.
Scherzer et al., "Investigations on the Photoinitiator-free Photopolymerization of Acrylates by Vibrational Spectroscopic Methods", *Macromol. Symp.*, 230, (2005), pp. 173-182.
Elsner et al., "Photoinitiator-Free Plasma-Induced Polymerization and Microstructuring of Acrylate-Based Coatings on 3D Substrates", *Macromolecular Materials and Engineering*, 294, (2009), pp. 422-431.
"The Power of Light", Apr. 30, 2013 (Apr. 30, 2013), XP055178191, Retrieved from the Internet: URL:http://www.fusionuv.com/uploadedFiles/PDF_Library/SB649PowerLight.pdf [retrieved on Mar. 20, 2015].
Yang Jianwen, "Light Curing Coating and Application", pp. 324-325, Chemical Industry Press, Jan. 2005.

* cited by examiner

METHODS FOR PRODUCING AN AT LEAST PARTIALLY CURED LAYER

CROSS REFERENCE TO RELATED APPLICATIONS

This application is a divisional of U.S. application Ser. No. 13/590,260, filed Aug. 21, 2012, now allowed, which claims the benefit of U.S. Provisional Application No. 61/530,184, filed Sep. 1, 2011, the disclosures of which are incorporated by reference in their entirety herein

FIELD

The disclosure relates to the curing of layers, and particularly to the production of a (co)polymeric release layer by at least partially curing a layer including a (meth)acrylate-functional siloxane using a source of short wavelength, polychromatic ultraviolet radiation.

BACKGROUND

The free radical polymerization of ethylenically unsaturated monomers is known. Polymers formed by this mechanism from monomers or oligomers having acrylic, methacrylic, vinyl ester and styrenic functionalities are major constituents in many films and cured layers, including protective layers, release layers, and adhesives. Polymerization typically involves the use of an added compound (an "initiator") that initiates the reaction of and chain formation by such monomers. When free-radical initiators are used, the initiation step typically consists of two reactions. In the first reaction, the initiator undergoes cleavage or dissociation upon exposure to a source of radiation (e.g., heat, ultraviolet light, etc.), causing the formation of at least one radical species of the initiator. In a second step, this radical then combines with a first monomer to form a chain initiating species of the polymer. Once formed, this chain initiating radical propagates the polymerization reaction, incorporating other monomers into a growing polymer chain.

When electromagnetic radiation is the source of energy used to initiate and polymerize free radically reactive monomers, photoinitiators that absorb light and form radical species when exposed to energy in the ultraviolet to visible range (250 to 700 nm) are typically employed. These photoinitiators may be organic, organometallic, or inorganic compounds, but are most commonly organic in nature. Examples of commonly used organic free radical photoinitiators include benzoin and its derivatives, benzil ketals, acetophenone, acetophenone derivatives, benzophenone, and benzophenone derivatives. Alternatively, electron-beam (e-beam) radiation may be used without a photoinitiator to induce formation of radical species which can initiate chain growth and (co)polymer formation.

SUMMARY

In one aspect, the present disclosure features a method for producing an at least partially cured layer (optionally a fully cured layer), the method including applying a layer containing a (meth)acrylate-functional siloxane to a major surface of a substrate, and irradiating the layer, in a substantially inert atmosphere containing no greater than 500 ppm oxygen, with a short wavelength polychromatic ultraviolet light source having at least one peak intensity at a wavelength of from about 160 (+/−5) nanometers (nm) to about 240 (+/−5) nm to at least partially cure the layer. Optionally, the layer is at a curing temperature greater than 25° C.

In some exemplary embodiments of the foregoing, the layer is applied at a thickness of about 0.1 (+/−0.05) micrometer (μm) to about 5 (+/−0.1)μm prior to irradiation with the short wavelength polychromatic light source. In certain exemplary embodiments, the layer is applied at a thickness of about 0.4 (+/−0.05)μm to about 1 (+/−0.1)μm prior to irradiation with the short wavelength polychromatic light source.

In certain exemplary embodiments of any of the foregoing, the at least one peak intensity is at a wavelength between about 170 (+/−5) nm to about 220 (+/−5) nm. In some exemplary embodiments, the at least one peak intensity is at a wavelength of about 185 (+/−2) nm. In some particular exemplary embodiments, the short wavelength polychromatic ultraviolet light source includes at least one low pressure mercury vapor lamp, at least one low pressure mercury amalgam lamp, at least one pulsed Xenon lamp, at least one glow discharge from a polychromatic plasma emission source, or combinations thereof.

In certain exemplary embodiments of any of the foregoing, the layer further comprises one or more copolymerizable materials selected from the group consisting of monofunctional (meth)acrylate monomers, difunctional (meth)acrylate monomers, polyfunctional (meth)acrylate monomers having functionality greater than two, vinyl ester monomers, vinyl ester oligomers, vinyl ether monomers, and vinyl ether oligomers.

In some exemplary embodiments of any of the foregoing, the layer further comprises at least one functional polysiloxane material which does not comprise a (meth)acrylate functionality. In certain such exemplary embodiments, the functional polysiloxane material is selected from the group consisting of a functional (but non-(meth)acrylate-functional) polysiloxane selected from a vinyl-functional polysiloxane, a hydroxy-functional polysiloxane, an amine-functional polysiloxane, a hydride-functional polysiloxane, an epoxy-functional polysiloxane, and combinations thereof. In any of the foregoing exemplary embodiments, the layer may further comprise at least one non-functional polysiloxane material.

In some particular exemplary embodiments of any of the foregoing, the layer further includes at least one non-functional polysiloxane material. In some such embodiments, the at least one non-functional polysiloxane material is selected from a poly(dialkylsiloxane), a poly(alkylarylsiloxane), a poly(diarylsiloxane), or a poly(dialkyldiarylsiloxane), optionally wherein the non-functional polysiloxane material comprises from 0.1 wt. % to 95 wt. %, inclusive, of the layer.

In some alternative exemplary embodiments of any of the foregoing embodiments except for those described in the two immediately preceding paragraphs, the layer consists essentially of one or more (meth)acrylate-functional siloxane monomers. In certain such embodiments, the layer consists essentially of one or more (meth)acrylate-functional siloxane oligomers. In other such exemplary embodiments, the layer consists essentially of one or more (meth)acrylate-functional polysiloxanes.

In any of the foregoing exemplary embodiments, the layer may be (is) substantially free of a photoinitiator. In any of the foregoing exemplary embodiments, the layer may be (is) substantially free of an organic solvent. In any of the foregoing exemplary embodiments, the substantially inert atmosphere may include (comprises) no greater than 50 ppm oxygen. In any of the foregoing exemplary embodiments, applying the layer to the surface of the substrate includes applying a discontinuous coating.

In further exemplary embodiments of any of the foregoing, the substrate is selected from the group consisting of paper, including poly-coated Kraft paper and supercalendered or glassine Kraft paper, metal, metal foil, poly(ethylene terephthalate), poly(ethylene naphthalate), polycarbonate, polypropylene, biaxially-oriented polypropylene, polyethylene, polyamide, cellulose acetate, ethyl cellulose and combinations thereof.

In additional exemplary embodiments of any of the foregoing, the at least partially cured layer is a release layer having an unaged peel adhesion less than about 1.0 Newtons per decimeter. In still further exemplary embodiments, the at least partially cured layer is a release layer having an unaged peel adhesion greater than about 4.0 Newtons per decimeter. Optionally, the release layer has an aged peel adhesion less than 50 percent greater than the unaged peel adhesion. Further optionally, the release layer is used as a surface protection layer in a release liner or as a low adhesion backsize (LAB) in an adhesive article, for example, an adhesive tape.

In another aspect, an adhesive article includes the foregoing release layer, and an adhesive layer opposite the release layer on a substrate, optionally wherein the adhesive layer comprises one or more adhesive selected from a pressure sensitive adhesive, a hot melt adhesive, a radiation curable adhesive, a tackified adhesive, a non-tackified adhesive, a synthetic rubber adhesive, a natural rubber adhesive, a (meth)acrylic (co)polymer adhesive, a silicone adhesive, and a polyolefin adhesive. Optionally, the adhesive layer includes one or more adhesive selected from a pressure sensitive adhesive, a hot melt adhesive, a radiation curable adhesive, a tackified adhesive, a non-tackified adhesive, a synthetic rubber adhesive, a natural rubber adhesive, a (meth)acrylic (co)polymer pressure sensitive adhesive, a silicone adhesive, and a polyolefin adhesive.

Various aspects and advantages of exemplary embodiments of the present disclosure have been summarized. The above Summary is not intended to describe each illustrated embodiment or every implementation of the present invention. Further features and advantages are disclosed in the embodiments that follow. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

Figure 1:
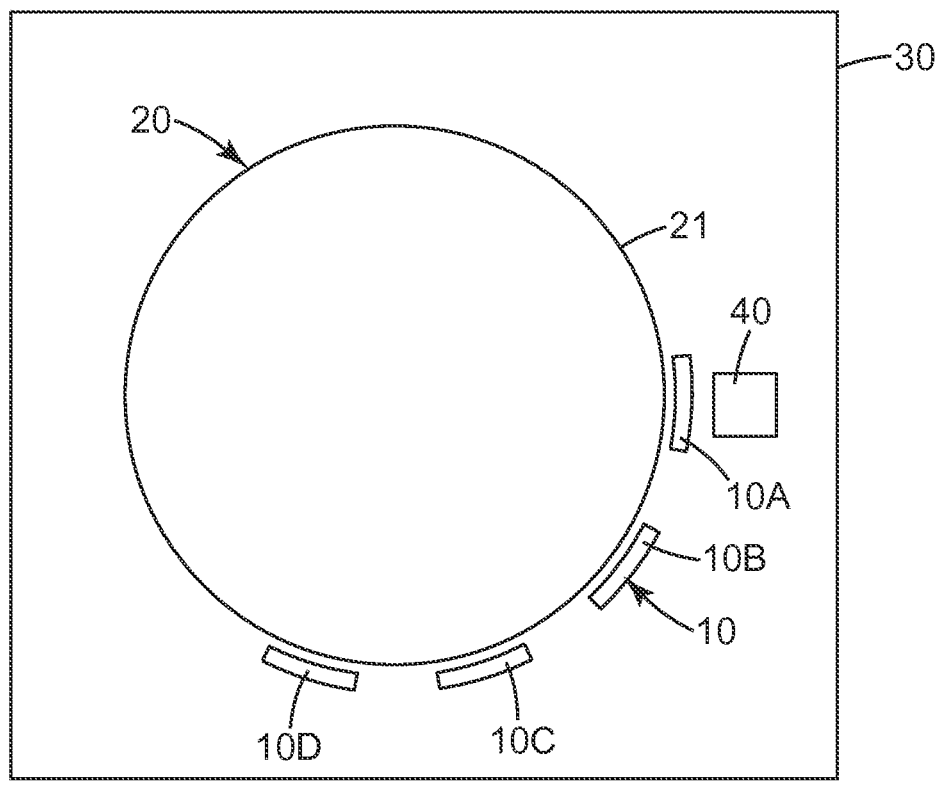
FIG. 1 illustrates an exemplary ultraviolet radiation curing chamber useful in some exemplary embodiments of the present disclosure.

While the above-identified drawings, which may not be drawn to scale, set forth various embodiments of the present disclosure, other embodiments are also contemplated, as noted in the Detailed Description. In all cases, this disclosure describes the presently disclosed invention by way of representation of exemplary embodiments and not by express limitations. It should be understood that numerous other modifications and embodiments can be devised by those skilled in the art, which fall within the scope and spirit of this invention.

DETAILED DESCRIPTION

As used in this Specification, the recitation of numerical ranges by endpoints includes all numbers subsumed within that range (e.g. 1 to 5 includes 1, 1.5, 2, 2.75, 3, 3.8, 4, and 5, and the like).

Unless otherwise indicated, all numbers expressing quantities or ingredients, measurement of properties and so forth used in the Specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following defined terms, these definitions shall be applied for the entire Specification, including the claims, unless a different definition is provided in the claims or elsewhere in the Specification based upon a specific reference to a modification of a term used in the following Glossary:

Glossary

The words "a", "an", and "the" are used interchangeably with "at least one" to mean one or more of the elements being described.

The term "layer" refers to any material or combination of materials on or overlaying a substrate.

Words of orientation such as "atop, "on," "covering," "uppermost," "overlaying," "underlying" and the like for describing the location of various layers, refer to the relative position of a layer with respect to a horizontally-disposed, upwardly-facing substrate. It is not intended that the substrate, layers or articles encompassing the substrate and layers, should have any particular orientation in space during or after manufacture.

The terms "overcoat" or "overcoated" to describe the position of a layer with respect to a substrate or another layer of a multi-layer construction, means that the described layer is atop or overlaying the substrate or another layer, but not necessarily adjacent to or contiguous with either the substrate or the other layer.

The term "separated by" to describe the position of a layer with respect to another layer and the substrate, or two other layers, means that the described layer is between, but not necessarily contiguous with, the other layer(s) and/or substrate.

The term "intensity peak" refers to a local maximum in an emission spectrum for a UV radiation source when plotted as emission intensity as a function of emission wavelength. The emission spectrum may have one or more intensity peaks over the wavelength range covered by the emission spectrum. Thus, an intensity peak need not correspond to the maximum emission intensity peak over the entire wavelength range covered by the emission spectrum.

The terms "polychromatic UV radiation," "polychromatic UV light," "short wavelength polychromatic UV radiation," and "short wavelength polychromatic UV light" all refer to ultraviolet radiation or light having an emission wavelength of 400 nm or less wherein the emission spectrum includes at least two intensity peaks, with at least one intensity peak occurring at no greater than 240 nanometers (nm).

The term "substantially inert atmosphere" refers to an atmosphere having an oxygen content of no greater than 500 ppm.

The term "(meth)acrylic" or "(meth)acrylic-functional" includes materials that include one or more ethylenically unsaturated acrylic- and/or methacrylic-functional groups, e.g. -AC(O)C(R)=CH$_2$, preferably wherein A is O, S or NR', wherein R' is a hydrogen atom or a hydrocarbon group; and R is a 1-4 carbon lower alkyl group, H or F.

The term "siloxane" includes any chemical compound composed of units of —O—Si—O— and having the generalized formula R'$_2$SiO, wherein R' is a hydrogen atom or a hydrocarbon group.

The term "(co)polymer" or "(co)polymeric" includes homopolymers and copolymers, as well as homopolymers or copolymers that may be formed in a miscible blend, e.g., by coextrusion or by reaction, including, e.g., transesterification. The term "copolymer" includes random, block, graft, and star copolymers.

The term "cure" or "curable" refers to a process that causes a chemical change, e.g., a reaction to solidify a layer or increase its viscosity.

The term "cured (co)polymer layer" or "cured (co)polymer" includes both cross-linked and uncross-linked (co)polymers.

The term "cross-linked" (co)polymer refers to a (co)polymer whose (co)polymer chains are joined together by covalent chemical bonds, usually via cross-linking molecules or groups, to form a network (co)polymer. A cross-linked (co)polymer is generally characterized by insolubility, but may be swellable in the presence of an appropriate solvent.

The term "unaged peel adhesion" refers to peel adhesion measured according to the release test described herein on a release surface maintained at a temperature of no more than 25° C. at no more than 75% relative humidity for no more than 24 hours before the measurement. Preferably, the unaged peel adhesion is measured on a release surface within one hour of preparation of the release surface.

The term "aged peel adhesion" refers to peel adhesion measured according to the release test described herein on a release surface aged for at least seven days at 90° C. and 90% relative humidity.

Various exemplary embodiments of the disclosure will now be described with particular reference to the Drawings. Exemplary embodiments of the invention may take on various modifications and alterations without departing from the spirit and scope of the disclosure. Accordingly, it is to be understood that the embodiments of the invention are not to be limited to the following described exemplary embodiments, but are to be controlled by the limitations set forth in the claims and any equivalents thereof.

Identification of a Problem to be Solved

Commonly available medium pressure mercury vapor lamps emit a broad spectrum of radiation across the ultraviolet (UV) and visible light ranges, and peak in UV intensity at emission ranges of 250 to 260 nanometers (nm), 310 to 320 nm, and 350 to 380 nm. Although formulations of photoinitiator and monomers generally are tailored to (co)polymerize at one or more of these peak emissions, radiation at other wavelengths in this emission spectrum can result in undesired and deleterious properties in films and release layers (co)polymerized using such mercury vapor lamps. Furthermore, in order to initiate (co)polymerization, addition of a photoinitiator is generally necessary to capture the incident radiation and generate an initiating radical species.

While effective in the free radical (co)polymerization of these monomers, the use of photoinitiators can often compromise the properties and purity of the (co)polymerized material, particularly when used as a release layer. Determining the optimal concentration of photoinitiator, particularly in thicker release layers, often requires making concessions between critical factors such as (co)polymerization rate, curing at the surface or the bulk curing of the coating, and/or limiting the level of unreacted or residual monomers or photoinitiators.

For example, lower photoinitiator levels tend to reduce residual photoinitiator content and allow the penetration of light through the depth of the coating, but also reduce the cure rate of the coating or film. Higher photoinitiator levels promote cure rate and surface cure of photo(co)polymerized release layers, but potentially lead to incomplete (co)polymerization of the coating's bulk and unacceptably high levels of residual photoinitiator. The presence of such residual photoinitiators and photoinitiator by-products affects both the potential commercial applications and long term stability of photo(co)polymerized release layers made in this manner.

Electron beam (e-beam) radiation curing provides another method for forming a cured release layer. Although e-beam curable release layers do not require addition of photoinitiators, several disadvantages of such e-beam release layers are well known. The cost to purchase and operate an e-beam is significantly greater than an ultraviolet source. In addition, e-beams are much less selective than ultraviolet light. Whereas light must be absorbed by a species for reaction to proceed, response of a material to an e-beam is only dependent on atomic number and a multitude of reaction pathways are often available. Further, depth of cure is often limited by the specific energy of the electrons, usually restricting cure to depths of less than 0.005 dm. Substrate damage is also a concern in the use of e-beams because many common substrates are adversely affected by exposure to electrons.

Initiation of radiation curing of (meth)acrylate-functional monomers and oligomers without added photoinitiators using monochromatic, short wavelength UV radiation has recently been described by Wright (U.S. Pat. No. 5,891,530) and Scherzer et al. [*Nucl. Instr. and Meth. in Phys. Res. B*, 208, p. 271-276 (2003)].

Discovery of a Solution to the Problem

We have surprisingly discovered that short wavelength, polychromatic UV radiation sources (e.g. a low-pressure mercury arc lamp, and/or a mercury amalgam lamp having enhanced short wavelength output at 185 nm), is capable of initiating curing, (co)polymerization, or cross-linking of these same chemistries without added photoinitiator. The low cost of the low-pressure mercury amalgam lamp coupled with its longer bulb lifetime and availability in lengths of up to 1.8 meters make this an attractive option for use in continuous, short wavelength polychromatic UV-radiation curing of release layers applied to moving substrate or webs in industrial coating processes.

A process for producing UV-radiation cured release layers that improves upon inexpensive longer wavelength (e.g. 250-400 nm wavelength) polychromatic mercury vapor lamps that require photoinitiators, on the one hand; and expensive short wavelength, monochromatic excimer lamps that don't require added photoinitiators, on the other hand, would be highly advantageous. It would be especially desirable to provide an inexpensive and rapid method of curing a layer that is initiator-free and which would thus yield release layers free of the residual initiator or initiator by-products found in typical free radically (co)polymerized release layers prepared by other known methods.

Method of Producing an at Least Partially Cured Layer

Thus, in one aspect, the present disclosure describes a method for producing an at least partially cured layer (optionally a fully cured layer), the method including applying a layer comprising a (meth)acrylate-functional siloxane to a surface of a substrate, and irradiating the layer in a substantially inert atmosphere with a short wavelength polychromatic ultraviolet light source having a peak intensity at a wavelength of from about 160 (+/−5) nanometers (nm) to about 240 (+/−5) nm to at least partially cure the layer. Optionally, the layer is at a curing temperature greater than 25° C.

Thus, in some exemplary embodiments, the material comprising the layer may be heated to a temperature greater than 25° C. during or subsequent to application of the layer to the substrate. Alternatively, the material comprising the layer may be provided at a temperature of greater than 25° C., e.g. by heating or cooling the material comprising the layer before, during, and/or after application of the layer to the substrate. Preferably, the layer is at a temperature of at least 50° C., 60° C. 70° C., 80° C., 90° C., 100° C., 125° C., or even 150° C. Preferably the layer is at a temperature of no more than 250° C., 225° C., 200° C., 190° C., 180° C., 170° C., 160° C., or even 155° C.

Applying a Layer to a Substrate

Methods of the present disclosure involve applying a layer comprising a (meth)acrylate-functional siloxane to a major surface of a substrate. Generally, the materials comprising the layer may be oils, fluids, gums, elastomers, or resins, e.g., friable solid resins. Generally, lower molecular weight, lower viscosity materials are referred to as fluids or oils, while higher molecular weight, higher viscosity materials are referred to as gums; however, there is no sharp distinction between these terms. Elastomers and resins have even higher molecular weights than gums and typically do not flow. As used herein, the terms "fluid" and "oil" refer to materials having a dynamic viscosity at 25° C. of no greater than 1,000,000 mPa·sec (e.g., less than 600,000 mPa·sec), while materials having a dynamic viscosity at 25° C. of greater than 1,000,000 mPa·sec (e.g., at least 10,000,000 mPa·sec) are referred to as "gums."

In order to obtain the low thicknesses generally desirable for some silicone coatings, e.g., silicone release materials, it is often necessary to dilute high molecular weight materials with solvents in order to coat or otherwise apply them to a substrate. In some embodiments, it may be preferable to use low molecular weight silicone oils or fluids, including those having a dynamic viscosity at 25° C. of no greater than 200,000 mPa·sec, no greater than 100,000 mPa·sec, or even no greater than 50,000 mPa·sec.

In some embodiments, it may be useful to use materials compatible with common solventless coating operations, including, e.g., those having a kinematic viscosity at 25° C. of no greater than 50,000 centistokes (cSt), e.g., no greater than 40,000 cSt, or even no greater than 20,000 cSt. In some embodiments, it may be desirable to use a combination of silicone materials, wherein at least one of the silicone materials has a kinematic viscosity at 25° C. of at least 5,000 centistokes (cSt), e.g., at least 10,000 cSt, or even at least 15,000 cSt. In some embodiments, it may be desirable to use materials in the layer having a kinematic viscosity at 25° C. of between 1000 and 50,000 cSt, e.g., between 5,000 and 50,000 cSt, or even between 10,000 and 50,000 cSt.

In general, depending on the selected material comprising the layer, including its viscosity, any known coating method may be used. Exemplary coating methods include roll coating, spray coating, dip coating, gravure coating, bar coating, vapor coating, and the like. Once coated, the silicone material is exposed to short wavelength ultraviolet radiation.

In accordance with the method of the disclosure, the (meth)acrylate-functional siloxane may be coated via any of a variety of conventional coating methods, such as roll coating, knife coating, or curtain coating. The low viscosity (co)polymerization mixtures are preferably coated by means specifically adapted to deliver thin release layers, preferably through the use of precision roll coaters and electrospray methods such as those described in U.S. Pat. Nos. 4,748,043 and 5,326,598 (both to Seaver et al.). Higher viscosity mixtures which can be coated to higher thickness (e.g., up to about 500 μm) can be provided by selecting higher molecular weight oligomeric starting materials. Oligomeric or (co)polymeric starting materials can also be thickened with adjuvants (e.g. thickeners), including but not limited to particulate fillers such as colloidal silica and the like, prior to coating.

In some exemplary embodiments of any of the foregoing, the layer is applied at a thickness of about 0.1 (+/−0.05) micrometer (μm) to about 5 (+/−0.1)μm prior to irradiation with the short wavelength polychromatic light source. In certain exemplary embodiments, the layer is applied at a thickness of at least about 0.2 (+/−0.05)μm, 0.3 (+/−0.05) μm, 0.4 (+/−0.05)μm, or even 0.5 (+/−0.05)μm; to about 4 (+/−0.1)μm, 3 (+/−0.1)μm, 2 (+/−0.1)μm, or even 1 (+/−0.1) μm, prior to irradiation with the short wavelength polychromatic light source.

In other exemplary embodiments, the at least partially cured layer or even the fully cured layer may have a thickness of 0.1 (+/−0.05) micrometer (μm) to about 5 (+/−0.1) μm. In certain exemplary embodiments, the at least partially cured layer or even the fully cured layer has a thickness of at least about 0.2 (+/−0.05)μm, 0.3 (+/−0.05) μm, 0.4 (+/−0.05)μm, or even 0.5 (+/−0.05)μm; to about 4 (+/−0.1)μm, 3 (+/−0.1)μm, 2 (+/−0.1)μm, or even 1 (+/−0.1) μm.

In any of the foregoing exemplary embodiments, applying the layer to the surface of the substrate includes applying a discontinuous coating. In other words, the layer need not cover the entire major surface of the substrate, and only a portion of the substrate surface may be covered by the layer. For example, the layer may be applied to the substrate as a single strip or stripe, or as a plurality of strips or stripes, as a plurality of dots, or in any other discernible pattern.

UV-Radiation Curing the Layer

Exemplary methods of the present disclosure include UV-radiation curing of the layer, by irradiating the layer, in a substantially inert atmosphere containing no greater than 500 ppm oxygen, with radiation (e.g. light) emitted from a short wavelength polychromatic ultraviolet light source having a peak intensity at a wavelength of from about 160 (+/−5) nanometers (nm) to about 240 (+/−5) nm, to at least partially cure the layer.

Substantially Inert Atmosphere

Substantially inert atmospheres are particularly useful in embodiments in which the UV-radiation source has radiant output at wavelengths of less than 200 nm. In such embodiments, oxygen gas present in the environment may absorb the UV radiation, thereby substantially preventing the radiation from reaching the target surface. Thus, in any of the foregoing exemplary embodiments, the substantially inert atmosphere includes no greater than 500 ppm oxygen. In some of the foregoing exemplary embodiments, the substantially inert atmosphere includes no greater than 400 ppm oxygen, 300 ppm oxygen, 200 ppm oxygen, or even 100 ppm oxygen. In some of the foregoing exemplary embodiments, the substantially inert atmosphere includes no greater than 50 ppm oxygen, no greater than 40 ppm, 30 ppm, 20 ppm, or even 10 ppm oxygen.

In some exemplary embodiments, the substantially inert atmosphere may comprise an inert gas such as nitrogen, helium, argon, or the like. In one embodiment, the methods of the present disclosure may be carried out in an inert environment including nitrogen. In embodiments in which an inert gas is used, oxygen levels in the environment may be as low as 50 ppm, 25 ppm, or even as low as 10 ppm, and as high as 100 ppm, or even 500 ppm.

In further exemplary embodiments, the controlled environment may be operated in a vacuum or a partial vacuum. In some such embodiments in which vacuum pressures are employed, the pressures may be as low as $10^{-4}$ torr, $10^{-5}$ torr, or even as low as $10^{-6}$ torr; and be as high as $10^{-1}$ torr, 1 torr, or even 10 torr.

Short Wavelength Polychromatic Ultraviolet Light Sources

In further exemplary embodiments, the material comprising the layer is exposed to short wavelength polychromatic ultraviolet radiation after applying the layer to the substrate, to at least partially cure the layer on the substrate. Short wavelength polychromatic ultraviolet light sources useful in the method of the present disclosure are those having output in the region from about 160 (+/−5) nm to about 240 (+/−5) nm, inclusive. In some exemplary embodiments of any of the foregoing, a peak intensity is at a wavelength between about 170 (+/−5) nm, 180 (+/−5) nm, or even 190 (+/−5) nm; to about 215 (+/−5) nm, 210 (+/−5) nm, 205 (+/−5) nm, or even 200 (+/−5) nm. In some particular exemplary embodiments, a peak intensity is at a wavelength of about 185 (+/−2) nm.

In certain such exemplary embodiments, the short wavelength polychromatic ultraviolet light source includes at least one low pressure mercury vapor lamp, at least one low pressure mercury amalgam lamp, at least one pulsed Xenon lamp, at least one glow discharge from a polychromatic plasma emission source, or combinations thereof.

Suitable plasma emission sources may involve excitation of a carrier gas (e.g. nitrogen) to generate electrons, ions, radicals, and photons in the form of a glow discharge. As reported in, for example, Elsner et al. [*Macromol. Mater. Eng.*, 294, 422-31 (2009)], a variety of acrylate monomers can be cured in the absence of photoinitiators using a nitrogen plasma polymerization process in which a glow discharge (i.e., UV-radiation emission) having peak intensities near 150 nm, 175 nm, and 220 nm was observed.

The intensities of incident radiation useful in the processes of the present disclosure can be from as low as about 1 mW/cm$^2$ to about 10 W/cm$^2$, preferably 5 mW/cm$^2$ to about 5 W/cm$^2$, more preferably 10 mW/cm$^2$ to 1 W/cm$^2$. When higher power levels are provided (e.g., greater than about 10 W/cm$^2$), volatilization of low molecular weight (meth)acrylate-functional siloxane monomers and oligomers can result.

In some exemplary embodiments, it is desirable to select a short wavelength polychromatic ultraviolet source having an intensity peak at a wavelength resulting in an absorbance greater than zero but no greater than about 0.5 (+/−0.05), as determined by Beer's law for the particular silicone resin being cured and the thickness. When the absorbance goes above 0.5, a surface layer or skin may form due to the lack of penetration of the radiation through the coating thickness resulting in surface absorption and localized polymerization and cross-linking Absorbances below 0.3 are acceptable and tend to give more uniform penetration and cure profiles but are less efficient in terms of radiation capture.

In certain exemplary embodiments, the absorbance determined by Beer's law is between 0.3 and 0.5, inclusive, e.g., between 0.4 and 0.5, inclusive, or even between 0.40 and 0.45, inclusive. As the actual absorbance and the absorbance calculated by Beer's law increase linearly with thickness, a particular silicone resin may have the desired absorbance at one thickness, e.g., 1 micrometer, while the absorbance of the same silicone resin at a greater thickness, e.g., 10 micrometers, may be too high.

Materials

The layer comprises material that is capable of undergoing at least a partial cure when exposed to short wavelength polychromatic ultraviolet radiation. In the presently disclosed embodiments, the layer comprises at least one (meth)acrylate-functional siloxane. In some such exemplary embodiments of any of the foregoing disclosed embodiments, the layer consists essentially of one or more (meth)acrylate-functional siloxane monomers. In other such exemplary embodiments, the layer consists essentially of one or more (meth)acrylate-functional siloxane oligomers. In certain other such exemplary embodiments, the layer consists essentially of one or more (meth)acrylate-functional polysiloxanes.

Substrates

The curable materials are applied as a layer on at least a portion of at least one major surface of a suitable flexible or rigid substrate or surface or backing, and irradiated using the prescribed ultraviolet radiation sources. Useful flexible substrates include, but are not limited to, paper, poly-coated Kraft paper, supercalendered or glassine Kraft paper, plastic films such as poly(propylene), biaxially-oriented polypropylene, poly(ethylene), poly(vinyl chloride), polycarbonate, poly(tetrafluoroethylene), polyester [e.g., poly(ethylene terephthalate)], poly(ethylene naphthalate), polyamide film such as DuPont's KAPTON™, cellulose acetate, and ethyl cellulose.

In addition, suitable substrates may be formed of metal, metal foil, metallized (co)polymeric film, or ceramic sheet material. Substrates may also take the form of a cloth backing, e.g. a woven fabric formed of threads of synthetic fibers, or a nonwoven web or substrate, or combinations of these. One of the advantages of the use of the short wavelength polychromatic ultraviolet light sources of the present disclosure is the ability to use such high energy, low heat sources to (co)polymerize mixtures coated on heat sensitive substrates. Commonly used longer wavelength ultraviolet lamps often generate undesirable levels of thermal radiation that can distort or damage a variety of synthetic or natural flexible substrates. Suitable rigid substrates include but are not limited to glass, wood, metals, treated metals (such as those comprising automobile and marine surfaces), (co)polymeric material and surfaces, and composite material such as fiber reinforced plastics.

In some exemplary embodiments, the substrates may be surface treated (e.g., corona or flame treatment), coated with, e.g., a primer or print receptive layer. In certain exemplary embodiments, multilayer substrates may be used. In certain exemplary embodiments, the substrate may be smooth or textured, e.g., embossed. In some exemplary embodiments, the substrate is embossed after curing the release material.

(Meth)Acrylate-Functional Siloxane

In general, (co)polymerizable (meth)acrylate-functional siloxanes are useful materials for preparing an at least partially (or in some embodiments completely) cured layer according to the present disclosure. Ethylenically unsaturated free radically (co)polymerizable siloxanes, including especially the (meth)acrylate-functional siloxane oligomers and (co)polymers containing telechelic and/or pendant acrylate or methacrylate groups, are particularly useful precursor materials for incorporation in the at least partially cured layers of the present disclosure. These (meth)acrylate-functional siloxane oligomers can be prepared by a variety of methods, generally through the reaction of chloro-, silanol-, aminoalkyl-, epoxyalkyl-, hydroxyalkyl-, vinyl-, or silicon hydride-functional polysiloxanes with a corresponding (meth)acrylate-functional capping agent. These preparations are reviewed in a chapter entitled "Photo(co)polymerizable Silicone Monomers, Oligomers, and Resins" by A. F. Jacobine and S. T. Nakos in *Radiation Curing Science and Technology*, (Plenum: New York, 1992), pp. 200-214.

Suitable (co)polymerizable (meth)acrylate-functional siloxane oligomers include those (meth)acryl-modified polylsiloxane resins commercially available from, for example, Goldschmidt Chemical Corporation (Evonik TEGO Chemie GmbH, Essen, Germany) under the TEGO™ RC designation. An example of a blend recommended for achieving premium (easy) release is a 70:30 (weight/weight, w/w) blend of TEGO RC922 and TEGO RC711.

Suitable (meth)acrylate-functional polysiloxane resins include the acrylamido-terminated monofunctional and difunctional polysiloxane resins described in U.S. Pat. No. 5,091,483 (Mazurek et al.). These (meth)acrylate-functional polysiloxane resins are pourable and may be blended for optimized properties such as level of release, adhesive compatibility, and substrate adhesion.

In some exemplary embodiments, the (co)polymerizable precursor composition making up the layer may include essentially only one or more (co)polymerizable (meth)acrylate-functional siloxane(s), and is substantially-free of other (co)polymerizable materials. Thus, in further exemplary embodiments of any of the foregoing, the layer consists essentially of one or more (meth)acrylate-functional siloxane monomers. In some such exemplary embodiments, the layer consists essentially of one or more (meth)acrylate-functional siloxane oligomers. In other such exemplary embodiments, the layer consists essentially of one or more (meth)acrylate-functional polysiloxanes.

Optional (Co)Polymerizable Starting Materials

In addition to the (meth)acrylate functional siloxane, the layer may optionally include one or more (co)polymerizable starting materials. Suitable (co)polymerizable starting materials may contain silicon or may not contain silicon.

Thus, in some exemplary embodiments, the layer further comprises a non-(meth)acrylate-functional siloxane monomer, oligomer, or (co)polymer. Such materials can be functional or non-functional. Examples of non-functional (co)polymerizable siloxanes include poly(dialkylsiloxanes), poly(dialkyldiarylsiloxanes), poly(alkylarylsiloxanes), and poly(diarylsiloxanes), and may be linear, cyclic, or branched. Examples of functional (but non-(meth)acrylate-functional) polysiloxanes that may be used include vinyl-functional polysiloxanes, hydroxy-functional polysiloxanes, amine-functional polysiloxanes, hydride-functional polysiloxanes, epoxy-functional polysiloxanes, and combinations thereof.

In certain exemplary embodiments, the layer further comprises one or more (co)polymerizable materials selected from the group consisting of monofunctional (meth)acrylate monomers, difunctional (meth)acrylate monomers, polyfunctional (meth)acrylate monomers having functionality greater than two, vinyl ester monomers, vinyl ester oligomers, vinyl ether monomers, and vinyl ether oligomers. Suitable vinyl-functional monomers include but are not limited to acrylic acid and its esters, methacrylic acid and its esters, vinyl-substituted aromatics, vinyl-substituted heterocyclics, vinyl esters, vinyl chloride, acrylonitrile, methacrylonitrile, acrylamide and derivatives thereof, methacrylamide and derivatives thereof, and other vinyl monomers (co)polymerizable by free-radical means.

Monofunctional Monomers

Monofunctional (meth)acrylate (co)monomers useful in the methods of the present disclosure include compositions of Formula 1:

$$[X-]_m-Z \qquad (1)$$

wherein X represents $H_2C=C(R_1)C(O)O-$, in which $R_1$ represents $-H$ or $-CH_3$, m=1, and Z represents a monovalent straight chain alkyl, branched alkyl or cycloalkyl group having from about 1 to about 24 carbon atoms. A class of particularly suitable monofunctional (co)monomers include monoethylenically unsaturated monomers having homopolymer glass transition temperatures ($T_g$) greater than about 0° C., preferably greater than 15° C.

Examples of suitable monofunctional (meth)acrylate monomers include but are not limited to those selected from the group consisting of methyl (meth)acrylate, isooctyl (meth)acrylate, 4-methyl-2-pentyl (meth)acrylate, 2-methylbutyl (meth)acrylate, isoamyl (meth)acrylate, sec-butyl (meth)acrylate, n-butyl (meth)acrylate, tert-butyl (meth)acrylate, isobornyl (meth)acrylate, butyl methacrylate, ethyl (meth)acrylate, dodecyl (meth)acrylate, octadecyl (meth)acrylate, cyclohexyl (meth)acrylate and mixtures thereof.

Particularly suitable monofunctional (meth)acrylate monomers include those selected from the group consisting of isooctyl (meth)acrylate, isononyl (meth)acrylate, isoamyl (meth)acrylate, isodecyl (meth)acrylate, 2-ethylhexyl (meth)acrylate, isobornyl (meth)acrylate, n-butyl (meth)acrylate, sec-butyl (meth)acrylate, and mixtures thereof.

Monofunctional vinyl ester monomers useful in the methods of the present disclosure include compositions of Formula 1 wherein X represents $H_2C=CHOC(O)-$, m=1, and Z represents a monovalent straight chain or branched alkyl group having from about 1 to about 24 atoms. Such vinyl ester monomers include but are not limited to those selected from the group consisting of vinyl acetate, vinyl 2-ethylhexanoate, vinyl caprate, vinyl laurate, vinyl pelargonate, vinyl hexanoate, vinyl propionate, vinyl decanoate, vinyl octanoate, and other monofunctional unsaturated vinyl esters of linear or branched carboxylic acids comprising 1 to 16 carbon atoms. Preferred vinyl ester monomers include those selected from the group consisting of vinyl acetate, vinyl laureate, vinyl caprate, vinyl-2-ethylhexanoate, and mixtures thereof.

Other suitable monofunctional (co)monomers include but are not limited to those selected from the group consisting of acrylic acid, methacrylic acid, itaconic acid, crotonic acid, maleic acid, fumaric acid, sulfoethyl methacrylate, N-vinyl pyrrolidone, N-vinyl caprolactam, acrylamide, t-butyl acrylamide, dimethyl amino ethyl acrylamide, N-octyl acrylamide, acrylonitrile, mixtures thereof, and the like. Preferred monomers include those selected from the group consisting of acrylic acid, N-vinyl pyrrolidone, and mixtures thereof.

Monofunctional Macromonomers or Oligomers

Free radically (co)polymerizable monofunctional macromonomers or oligomers (i.e. macromers) of Formula 1, wherein X is $H_2C=CR_1COO-$, $R_1$ represents $-H$ or $-CH_3$, m is 1, and Z is a monovalent (co)polymeric or oligomeric radical having a degree of (co)polymerization greater than or equal to 2, and that are substantially free of aromatic, chloro- and other moieties or substituents that significantly absorb ultraviolet radiation in the range of about 160 nm to about 240 nm, may also be used in the at least partially cured layers of the present disclosure.

Examples of such monofunctional macromonomers or oligomers include those selected from the group consisting of (meth)acrylate-terminated poly(methyl methacrylate), methacrylate-terminated poly(methyl methacrylate), (meth)acrylate-terminated poly(ethylene oxide), methacrylate-terminated poly(ethylene oxide), (meth)acrylate-terminated poly(ethylene glycol), methacrylate-terminated poly(ethylene glycol), methoxy poly(ethylene glycol) methacrylate, butoxy poly(ethylene glycol) methacrylate, and mixtures thereof. These functionalized materials are preferred because they are easily prepared using well-known ionic (co)polymerization techniques and are also highly effective in providing grafted oligomeric and (co)polymeric segments along free radically (co)polymerized (meth)acrylate (co)polymer backbones.

The viscosity of such monofunctional macromonomers or oligomers useful in practicing the methods of the present disclosure are generally high enough so that a thickener is not usually necessary; however; if desired, a thickener or particulate filler may be advantageously used as an adjuvant, as described further below.

Polyfunctional Monomers and Oligomers

Useful difunctional and other polyfunctional (meth)acrylate-functional free radically (co)polymerizable monomers include ester derivatives of alkyl diols, triols, tetrols, etc. (e.g., 1,4-butanediol di(meth)acrylate, 1,6-hexanediol di(meth)acrylate, trimethylolpropane tri(meth)acrylate, and pentaerythritol tri(meth)acrylate). Difunctional and polyfunctional (meth)acrylate and methacrylate monomers described in U.S. Pat. No. 4,379,201 (Heilmann et al.), such as 1,2-ethanediol di(meth)acrylate, 1,12-dodecanediol di(meth)acrylate, pentaerythritol tetr(meth)acrylate can also be used in the present disclosure.

Difunctional and polyfunctional (meth)acrylates and methacrylates including (meth)acrylated epoxy oligomers, (meth)acrylated aliphatic urethane oligomers, (meth)acrylated polyether oligomers, and (meth)acrylated polyester oligomers, such as those commercially available from UCB Radcure Inc, Smyrna, Ga. under the EBECRYL tradename, and those available from Sartomer, Exton, Pa., may also be employed.

Non-Functional Polysiloxanes

In further exemplary embodiments, the layer further includes at least one non-functional polysiloxane material. In some such further exemplary embodiments, the at least one non-functional polysiloxane material is selected from a poly(dialkylsiloxane), a poly(alkylarylsiloxane), a poly(diarylsiloxane), or a poly(dialkyldiarylsiloxane), optionally wherein the non-functional polysiloxane material comprises from 0.1 to 95 wt. %, inclusive, of the layer.

The non-functional polysiloxane material can be described generally by the following formula illustrating a siloxane backbone with a variety of substituents:

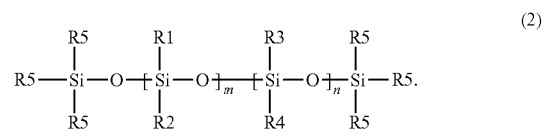

R1 through R4 represent the substituents pendant from the siloxane backbone. Each R5 may be independently selected and represent the terminal groups. Subscripts n and m are independently integers, and at least one of m or n is not zero.

As used herein, a "nonfunctional polysiloxane material" is one in which the R1, R2, R3, R4, and R5 groups are nonfunctional groups. As used herein, "nonfunctional groups" are either alkyl or aryl groups consisting of carbon, hydrogen, and in some embodiments, halogen (e.g., fluorine) atoms. In some embodiments, R1, R2, R3, and R4 are independently selected from the group consisting of an alkyl group and an aryl group, and R5 is an alkyl group. In some embodiments, one or more of the alkyl or aryl groups may contain a halogen substituent, e.g., fluorine. For example, in some embodiments, one or more of the alkyl groups may be $-CH_2CH_2C_4F_9$.

In certain exemplary embodiments, R5 is a methyl group, i.e., the nonfunctional polysiloxane material is terminated by trimethylsiloxy groups. In some embodiments, R1 and R2 are alkyl groups and n is zero, i.e., the material is a poly(dialkylsiloxane). In certain embodiments, the alkyl group is a methyl group, i.e., poly(dimethylsiloxane) ("PDMS"). In other embodiments, R1 is an alkyl group, R2 is an aryl group, and n is zero, i.e., the material is a poly(alkylarylsiloxane). In some particular embodiments, R1 is a methyl group and R2 is a phenyl group, i.e., the material is poly(methylphenylsiloxane). In other particular embodiments, R1 and R2 are alkyl groups and R3 and R4 are aryl groups, i.e., the material is a poly(dialkyldiarylsiloxane). In certain additional embodiments, R1 and R2 are methyl groups, and R3 and R4 are phenyl groups, i.e., the material is poly(dimethyldiphenylsiloxane).

In further exemplary embodiments, the polysiloxane backbone may be linear. In some alternative exemplary embodiments, the polysiloxane backbone may be branched. For example, one or more of the R1, R2, R3, and/or R4 groups may be a linear or branched siloxane with functional or nonfunctional (e.g., alkyl or aryl, including halogenated alkyl or aryl) pendant and terminal groups. In other alternative exemplary embodiments, the polysiloxane backbone may be cyclic. For example, the silicone material may be octamethylcyclotetrasiloxane, decamethylcyclo-pentasiloxane, or dodecamethylcyclohexasiloxane.

(Polyakyl)disiloxanes

In addition to the foregoing polysiloxanes, various (polyalkyl)disiloxanes may be advantageously used in the layer in addition to or in place of at least a portion of the non-functional polysiloxane material. In some exemplary embodiments, hexamethyldisiloxane (i.e. $O[Si(CH_3)_3]_2$) may be used advantageously as such a non-functional (polyalkyl)disiloxane.

Functional Polysiloxanes

In some exemplary embodiments, the polysiloxane material may be functional. Generally, functional silicone systems include specific reactive groups attached to the linear, branched, or polysiloxane backbone of the starting material. For example, a linear "functional polysiloxane material" is one in which at least one of the R-groups of Formula 3 is a functional group:

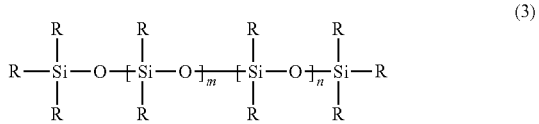

(3)

In some such embodiments, a functional polysiloxane material is one in which at least 2 of the R-groups are functional groups. Generally, the R-groups of Formula 3 may be independently selected. In some embodiments, all functional groups are hydroxy groups and/or alkoxy groups. In certain such exemplary embodiments, the functional polysiloxane is a silanol terminated polysiloxane, e.g., a silanol terminated poly(dimethylsiloxane). In other such embodiments, the functional silicone is an alkoxy terminated poly(dimethylsiloxane), e.g., dimethoxy terminated poly(dimethylsiloxane).

Other functional groups include those having an unsaturated carbon-carbon bond such as alkene-containing groups (e.g., vinyl groups and allyl groups) and alkyne-containing groups.

In addition to at least one functional R-group, the remaining R-groups may be nonfunctional groups, e.g., alkyl or aryl groups, including halogenated (e.g., fluorinated) alky and aryl groups. In some embodiments, the functionalized polysiloxane materials may be branched. For example, one or more of the R groups may be a linear or branched siloxane with functional and/or non-functional substituents. In some embodiments, the functionalized polysiloxane materials may be cyclic.

Although some embodiments of the present disclosure describe the use of functional silicone materials, the nature of the functional group is generally not critical to obtaining the desired cross-linked or cured polysiloxane materials. Although some reactions may occur through the functional groups, direct cross-linking between the polysiloxane backbones is often sufficient to obtain the desired degree of cure.

Optional Adjuvants

Various materials may be advantageously added to the (co)polymerizable composition used in forming the layer in order to achieve advantageous effects. Some such adjuvants include, but are not limited to, the following optional additives.

Catalysts and Initiators

In contrast to most previous methods for curing functional materials, the methods of the present disclosure do not require the use of added catalysts or initiators (e.g. photoinitiators). Thus, advantageously, in some exemplary embodiments, the methods of the present disclosure do not require the use of an added photoinitiator. In other words, exemplary methods of the present disclosure can be used to cure compositions that are "substantially free" of such catalysts or initiators (e.g. photoinitiators).

As used herein, a composition is "substantially free of added catalysts and initiators "if the composition does not include an "effective amount" of an added catalyst or initiator. As is well understood, an "effective amount" of a catalyst or initiator depends on a variety of factors including the type of catalyst or initiator, the composition of the curable material, and the curing method (e.g., thermal cure, UV-cure, and the like). In some embodiments, a particular catalyst or initiator is not present at an "effective amount" if the amount of catalyst or initiator does not reduce the cure time of the composition by at least 10% relative to the cure time for the same composition at the same curing conditions absent that catalyst or initiator.

As stated above, the use of added photoinitiators in the (co)polymerization of (meth)acrylate-functional siloxanes and oligomers introduces added costs and undesirable residuals and byproducts to the process. Articles bearing release layers prepared using the preferred initiator-free method are of particular significance in medical applications, where photoinitiator-induced contamination of release layers can lead to skin irritation and other undesirable reactions. Exclusion of this component can result in significant direct cost savings, plus elimination of any expenses involved in qualifying products containing significant amounts of a photoinitiator.

In other exemplary embodiments, an optional added photoinitiator may be advantageously included in the (co) polymerizable composition. Photoinitiators are particularly useful when higher (co)polymerization rates or very thin release layers (or surface cures) are required. When used, photoinitiators can constitute from as low as about 0.001 to about 5 percent by weight of a (co)polymerization mixture. These photoinitiators can be organic, organometallic, or inorganic compounds, but are most commonly organic in nature. Examples of commonly used organic photoinitiators include benzoin and its derivatives, benzil ketals, acetophenone, acetophenone derivatives, benzophenone, and benzophenone derivatives.

Organic Solvents

In contrast to most previous methods for curing functional materials, the methods of the present disclosure do not require the use of organic solvents. Thus, in any of the foregoing exemplary embodiments, the layer may be (is) substantially free of an organic solvent. In any of the foregoing exemplary embodiments that are substantially free of organic solvent, the substantially inert atmosphere preferably includes no greater than 500 ppm oxygen, even more preferably no greater than 50 ppm oxygen.

Thickeners or Particulate Fillers

In additional exemplary embodiments of any of the foregoing, the (co)polymerizable composition may further comprises a thickener. A thickener may be used in the (co) polymerizable composition of the present disclosure. A thickener may be used with monomers, but are generally not necessary with oligomers. Thickeners can increase the viscosity of the (co)polymerizable composition. The viscosity needs to be high enough to enable the (co)polymerizable composition to be coatable. In addition, the relatively high viscosity may play a role in contributing to the isolation of the free radicals, thereby improving conversion and reducing termination. A viscosity in the range of about 400-25,000 centipoise is typically desired.

Suitable thickeners are those which are soluble in the (co)polymerizable composition, and generally include oligomeric and polymeric materials. Such materials can be selected to contribute various desired properties or characteristics to resultant article. Examples of suitable polymeric thickening agents include copolymers of ethylene and vinyl esters or ethers, poly(alkyl acrylates), poly(alkyl methacrylates), polyesters such as poly(ethylene maleate), poly(propylene fumarate), poly(propylene phthalate), and the like.

Other suitable thickeners are particulate fillers which are insoluble in the (co)polymerizable composition, including but not limited to colloidal particulates having a median particle diameter of less than one micrometer. Suitable inorganic colloidal particulate fillers that may be used to good advantage as thickeners and/or adjuvants include commercially available fumed colloidal silicas such as CAB—

O—SILs (Cabot Corp., Billerica, Mass.) and AER-O-SILs (Evonik North America, Parsippany, N.J.), colloidal alumina, and the like.

Apparatus for Ultraviolet Radiation Curing

An exemplary apparatus for using short wavelength polychromatic ultraviolet radiation to cure a coating on a substrate is illustrated by FIG. 1. Exemplary substrates 10 each bearing a layer (e.g. 10A, 10B, 10C, 10D) of a UV-curable (co)polymerizable composition may be attached at various locations on the surface 21 of back up roll 20 located in vacuum chamber 30, as illustrated in FIG. 1. Short wavelength polychromatic ultraviolet radiation source(s) 40 (e.g., low-pressure short wavelength polychromatic mercury lamps) may be used to achieve curing of the layers on the substrates, thereby forming an at least partially cured layer (optionally a fully cured layer), such as e.g. a release layer or low adhesion backsize (LAB).

It will be understood that other apparatus, for example a continuous roll-to-roll web coater as described in U.S. Pat. No. 6,224,949, may be used in conjunction with one or more short wavelength polychromatic ultraviolet radiation sources to at least partially cure a layer of the (co)polymerizable composition on a substrate, for example, a continuous web or roll of material (e.g., a (co)polymeric film).

UV-Radiation Cured Articles

In further exemplary embodiments of any of the foregoing, the at least partially cured layer may be a release layer in a UV-radiation cured article, such as a liner or an adhesive tape or film. Optionally, the UV-radiation cured release layer is used as a surface release layer in a release liner, or as a low adhesion backsize (LAB) in an adhesive article.

UV-Radiation Cured Release Layers

Figure 2:
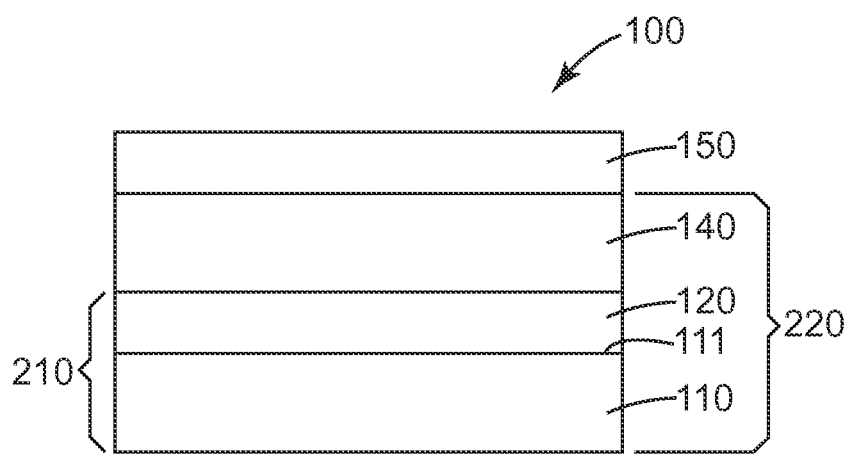
FIG. 2 illustrates an exemplary article including an ultraviolet radiation cured coating according to some exemplary embodiments of the present disclosure.

UV-radiation cured layers prepared according to the methods of the present disclosure may be used in any of a wide variety of applications, including, e.g., as release layers, low adhesion backsize layers, and the like. Various exemplary applications are illustrated in FIG. 2. Article 100 comprises first substrate 110 and cross-linked silicone layer 120 adhered to first surface 111 of first substrate 110 forming release liner 210. In some such exemplary embodiments, the release layer has an unaged peel adhesion less than about 1.6 Newtons per decimeter. Optionally, the release layer has an aged peel adhesion less than 50 percent greater than the unaged peel adhesion.

Another particularly useful coating derived from the method of the present disclosure involves the (co)polymerization of a (meth)acrylated siloxane to form a release layer under a substantially inert (i.e. oxygen content no greater than 500 ppm) atmosphere. The use of silicone release layers has been an industry standard for many years, and is widely employed by liner suppliers and large, integrated tape manufacturers. Release layers prepared in this manner may exhibit any desired level of release, including (1) premium or easy release, (2) moderate or controlled release, or (3) tight release; premium release requires the least amount of force.

Premium release layers (i.e., those release layers having aged release forces in the range of up to about 1.0 N/dm) are typically used in release liner applications. Premium release layers are less useful, however, when coated on the back surface of pressure-sensitive adhesive tapes, because their low release force can cause tape roll instability and handling problems. Such a release layer on the back surface of a pressure-sensitive adhesive tape construction is often referred to as a "low adhesion backsize." Release layers having moderate to high levels of aged release (about 4.0 to about 35 N/dm) are especially useful when used as low adhesion backsizes.

In addition, layers containing (meth)acrylated polysiloxanes for use in the production of release layers may include, as (co)polymerizable constituents, 100% (meth)acrylated polysiloxanes or, alternatively may include free radically (co)polymerizable diluents in addition to the (meth)acrylated polysiloxanes. Such non-polysiloxane free radically (co)polymerizable diluents can be used to modify the release properties of the release layers of the present disclosure and also enhance the coating's mechanical properties and anchorage to backings or substrates used in pressure-sensitive adhesive tape or release liner constructions.

Depending on the ultimate properties desired in the (co) polymerized release layers, useful non-polysiloxane free radically (co)polymerizable diluents include monofunctional, difunctional and polyfunctional (meth)acrylate vinyl ether, and vinyl ester monomers and oligomers. Difunctional and polyfunctional (meth)acrylate and methacrylate monomers such as 1,4-butanediol di(meth)acrylate, 1,6-hexanediol di(meth)acrylate, trimethylolpropane di(meth)acrylate, pentaerythritol tri(meth)acrylate 1,2-ethanediol di(meth) acrylate, 1,12 dodecanediol di(meth)acrylate, trimethylolpropane tri(meth)acrylate, pentaerythritol tetra(meth)acrylate and difunctional and polyfunctional (meth)acrylate and methacrylate oligomers including (meth)acrylated epoxy oligomers, (meth)acrylated aliphatic urethane oligomers, (meth)acrylated polyester oligomers, and (meth)acrylated polyethers such as those commercially available from Cytec Surface Specialties, Woodland Park, N.J. under the EBE-CRYL trade name, and from Sartomer, Exton, Pa., may also be advantageously employed.

The difunctional and polyfunctional (meth)acrylate monomers and oligomers employed in these release layers can be used at a concentration of from about 5 to about 95 weight percent, preferably from about 10 to 90 weight percent, based on the total weight of the release layer composition. Monofunctional monomers, such as the (meth) acrylate, vinyl ester and other free radically co(co)polymerizable monomers listed above, can also be added as non-polysiloxane free radically (co)polymerizable diluents in the release layer composition. When used, these monofunctional monomers may be employed at a concentration of up to about 25 weight percent based on the total weight of the release layer composition. Mixtures of monofunctional, difunctional and polyfunctional non-polysiloxane monomers and oligomers can also be used.

Adhesive Articles Including UV-Radiation Cured Release Layers

In another aspect, an adhesive article includes the foregoing release layer, and an adhesive layer adjacent to the release layer. Optionally, the adhesive layer includes one or more adhesive selected from a pressure sensitive adhesive, a hot melt adhesive, a radiation curable adhesive, a tackified adhesive, a non-tackified adhesive, a synthetic rubber adhesive, a natural rubber adhesive, a (meth)acrylic (co)polymer adhesive, and a polyolefin adhesive. In some embodiments, the adhesive may comprise a pressure sensitive adhesive, which preferably comprises a (meth)acrylic (co)polymer.

Thus, in some exemplary embodiments shown in FIG. 2, in addition to release liner 210, article 100 further comprises adhesive 140 releasably adhered to cross-linked silicone layer 120, forming transfer tape 220. In some embodiments, article 100 further comprises second substrate 150 adhered to adhesive 140, opposite cross-linked silicone layer 120.

In certain exemplary embodiments, the second substrate may be a release liner, e.g., a release liner similar to release liner 210, and article 100 may be a dual-linered transfer tape. In some embodiments, the second substrate may be permanently bonded to the adhesive and adhesive article 100 may be, for example, a tape or label.

Although not shown, in some embodiments, substrate 110 may be coated on both sides with a release material. In general, the release materials may be independently selected, and may be the same or different release materials. In some embodiments, both release materials are prepared according to the methods of the present disclosure. In some embodiments, self-wound adhesive articles may be prepared from such two-sided release liners. In some embodiments, one or more primer layers may be included. For example, in some embodiments, a primer layer may be located at surface 111 of substrate 110.

In various embodiments, the rolls of adhesive coated substrates of the present disclosure may be rolls of an adhesive tape that includes a backing layer and an adhesive coating disposed on a major surface of the backing layer. Common types of adhesive tapes include masking tape, electrical tape, duct tape, filament tape, medical tape, transfer tape, and the like.

The adhesive tape rolls may further include a release coating, or low adhesion backsize, disposed on a second major surface. Alternatively, the adhesive tape rolls may include a release liner (which may have a release coating disposed on a major surface thereof) in contact with the adhesive coated major surface of the backing layer. As another example, an adhesive tape roll may include a release liner comprising a release coating disposed on at least a portion of each of its major surfaces and an adhesive coating deposited over one of the release coatings.

Examples of suitable backing layers include, without limitation, CELLOPHANE, acetate, fiber, polyester, vinyl, polyethylene, polypropylene including, e.g., monoaxially oriented polypropylene and biaxially oriented polypropylene, polycarbonate, polytetrafluoroethylene, polyvinylfluoroethylene, polyurethane, polyimide, paper (e.g., Kraft paper), woven webs (e.g., cotton, polyester, nylon and glass), nonwoven webs, foil (e.g., aluminum, lead, copper, stainless steel and brass foil tapes) and combinations thereof.

The backing layers and release liners, can also include reinforcing agents including, without limitation, fibers, filaments (e.g., glass fiber filaments), and saturants (e.g., synthetic rubber latex saturated paper backings).

As noted above, the adhesive coating disposed on a major surface of the substrate may include a pressure sensitive adhesive. Pressure sensitive adhesives useful in the methods of the present disclosure may include, without limitation, natural rubber, styrene butadiene rubber, styrene-isoprene-styrene (co)polymers, styrene-butadiene-styrene (co)polymers, polyacrylates including (meth)acrylic (co)polymers, polyolefins such as polyisobutylene and polyisoprene, polyurethane, polyvinyl ethyl ether, silicones, and blends thereof.

In various embodiments, the pressure sensitive adhesives useful in the methods of the present disclosure may be UV-polymerized pressure sensitive adhesives. For purposes of the present disclosure, including the claims, the term "UV-polymerized pressure sensitive adhesives" may refer to pressure sensitive adhesives formed by polymerization of a pressure sensitive adhesive precursor composition (e.g., one or more mono-, di-, or polyfunctional monomers) that includes a photoinitiator, by exposure of the precursor composition to UV radiation. Examples of photoinitiators that may be utilized include free radical photoinitiators such as benzoin and its derivatives, benzil ketals, acetophenone and its derivatives, benzophenone and its derivatives, and phosphine oxides as well as cationic photoinitiators such as onium salts including diaryl iodonium and triarylsulfonium salts.

In other embodiments, the pressure sensitive adhesives useful in the methods of the present disclosure may be non-UV-polymerized pressure sensitive adhesives. Polymerization methods for such non-UV-polymerized pressure sensitive adhesives include, without limitation, thermal, e-beam, and gamma-ray treatment. It is to be appreciated that non-UV polymerization methods do not require the use of a photoinitiator. Therefore, non-UV-polymerized pressure sensitive adhesives (as well as the pressure sensitive adhesive precursor compositions) useful in the methods of the present disclosure may not include any amount of a photoinitiator.

Unexpected Results and Advantages

Exemplary embodiments of the present disclosure have advantages over use of other types of irradiation (e.g. e-beam radiation, monochromatic ultraviolet radiation, and the like). In contrast to most previous methods for curing functional materials, some exemplary embodiments of the present disclosure do not require the use of added catalysts or initiators to cure the layer.

For example, the 185 nm band of a low-pressure mercury amalgam lamp has been used to cure a variety of acrylate chemistries without photoinitiator at high speed. A single bulb, may, in some exemplary embodiments, be able to cure at speeds in excess of 15 mpm. Thus, an array of 20 of these bulbs having a downweb length of no more than about one meter should be able to cure these same chemistries at speeds in excess of 300 mpm. In some exemplary embodiments, the absence of photoinitiator allows formulated blends to have an extended shelf-life at ambient temperature which, when coupled with the high cure speeds and energy efficiency observed, make this an attractive alternative to the use of conventional medium-pressure mercury lamps or germicidal lamps for curing a variety of release layers, including silicones for LABs and release liners as well as clearcoats such as primers and hardcoats. In principle, the only restriction is the depth of cure which can be achieved due to the radiation penetration, which limits the practical coating thickness to a maximum on the order of about five micrometers for many of the common (meth)acrylate chemistries currently being used.

The polychromatic low-pressure mercury amalgam lamp is particularly attractive as a source of short wavelength UV radiation for at least some of the following reasons:
1. the absorbance of (meth)acrylate-functional siloxanes at 185 nm is much greater than it is at 222 nm, allowing for higher cure rates and line speeds to be achieved;
2. the presence of (meth)acrylate groups in the siloxane material allows the radicals to rapidly propagate and increase the rate of conversion;
3. 185 nm is also an optimal wavelength for absorption by PDMS-like release layers having a thickness in the range of 0.5 to 1.0 micrometer, inclusive;
4. polychromatic UV radiation with a peak at 185 nm is able to form a variety of radical species from polydimethylsiloxane units leading to additional reactions in which cross-links can form between radical sites on the polydimethylsiloxane backbone;
5. the cost of a short wavelength polychromatic UV-radiation source such as a low-pressure mercury lamp and/or a low pressure mercury amalgam lamp is significantly less than the cost of a monochromatic UV-excimer lamp;

6. the lifetime of a low-pressure mercury amalgam bulb is almost an order of magnitude longer than the lifetime of a UV-excimer bulb;
7. the electrical requirements for a low-pressure mercury amalgam lamp are much lower than for a UV-excimer lamp; and
8. low-pressure mercury amalgam lamps can be packed more closely to form an array of UV-radiation curing sources.

Exemplary embodiments of the present disclosure have been described above and are further illustrated below by way of the following Examples, which are not to be construed in any way as imposing limitations upon the scope of the present invention. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims.

EXAMPLES

The following examples are intended to illustrate exemplary embodiments within the scope of this disclosure. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Materials Used

The following materials, abbreviations, and trade names are used in the Examples:

TABLE I

Materials Used in the Examples

| Material Type | Trade Name or Acronym | Description |
|---|---|---|
| Silicone Monomer | RC-709 | Silicone acrylate used for controlled release available from Evonik North America, Inc. (Parsippany, NJ) |
| Silicone Monomer | RC-711 | Silicone acrylate with a low silicone to acrylate ratio available from Evonik North America, Inc. (Parsippany, NJ) |
| Silicone Monomer | RC-719 | Silicone acrylate available from Evonik North America, Inc. (Parsippany, NJ) |
| Silicone Monomer | RC-902 | Silicone acrylate with a high silicone to acrylate ratio available from Evonik North America, Inc. (Parsippany, NJ) |
| Silicone Monomer | RC-922 | Silicone acrylate with a high silicone to acrylate ratio available from Evonik North America (Parsippany, NJ) |
| Silicone Monomer | DMS-V46 | Vinyl terminated polydimethylsiloxane, available from Gelest, Inc. (Morrisville, PA) |
| Silicone Monomer | Silcolease UV Poly 110 | Acrylate functional silicone material available from Bluestar Silicones, Inc. (East Brunswick, NJ) |
| Polyfunctional Acrylate Monomer | SR-351 | Trimethylolpropane triacrylate, available from Sartomer Corp. (Exeter, PA) |
| Non-functional Polysiloxanes | DC-200-1K | Polydimethylsiloxane, 1,000 cSt polymer, available from Dow Corning, Inc. (Midland, MI) |
| Non-functional Polysiloxanes | DC-200-30K | Polydimethylsiloxane, 30,000 cSt polymer, available from Dow Corning, Inc. (Midland, MI) |
| Controlled Release Additive | DC-7035 | Controlled release additive in vinyl terminated polydimethylsiloxane, available from Dow Corning, Inc. (Midland, MI) |
| Photoinitiator | DAROCUR 1173 | 2-Hydroxy-2-methyl-1-phenyl-propan-1-one, available from Ciba GmbH (Basel, Switzerland) |
| Particulate Filler | AER-O-SIL 200 | Hydrophilic fumed silica, available from Evonik North America, Inc. (Parsippany, NJ) |
| Particulate Filler | AER-O-SIL R711 | Hydrophobic fumed silica surface treated with methacrylsilane, available from Evonik North America, Inc. (Parsippany, NJ) |
| Particulate Filler | AER-O-SIL R972 | Hydrophobic fumed silica surface treated with dimethyldichlorosilane, available from Evonik North America, Inc. (Parsippany, NJ) |
| Particulate Filler | AER-O-SIL R7200 | Hydrophobic fumed silica surface treated with methacrylsilane, available from Evonik North America, Inc. (Parsippany, NJ) |
| Particulate Filler | TMS-803 | Trimethylsiloxysilicate powder, available from Wacker Chemical Corporation (Adrian, MI) |
| Substrate | PET 1 | 50 micrometer thick, unprimed polyethylene terephthalate film from Mitsubishi Polyester Film, Inc. (Greer, SC) |
| Substrate | PET 2 | 50 micrometer thick, corona treated polyethylene terephthalate film from Mitsubishi Polyester Film, Inc. (Greer, SC) |

TABLE I-continued

Materials Used in the Examples

| Material Type | Trade Name or Acronym | Description |
|---|---|---|
| Substrate | PET 3 | 50 micrometer thick primed polyethylene terephthalate film (3SAB) from Mitsubishi Polyester Film, Inc. (Greer, SC) |
| Substrate | PCK 1 | Unprimed polycoated Kraft paper |
| Substrate | PCK 2 | Corona treated polycoated Kraft paper |
| Substrate | PP 1 | 76.2 micrometer thick cast polypropylene film, corona treated on one side |
| Substrate | BOPP | Biaxially-oriented polypropylene (BOPP) film |
| Low Adhesion Backsize | U-LAB | Si-free, polyurethane LAB, obtained from 3M Company (St. Paul, MN) |
| Pressure Sensitive Adhesive | PSA 1 | Tackified styrene-isoprene-styrene PSA, obtained from 3M Company (St. Paul, MN) |
| Pressure Sensitive Adhesive | PSA 2 | Untackified holt melt acrylic PSA, obtained from 3M Company (St. Paul, MN) |
| Pressure Sensitive Adhesive | PSA 3 | Tackified holt melt acrylic PSA, obtained from 3M Company (St. Paul, MN) |

Test Methods

The following test methods were used to evaluate (co) polymerized compositions of the Examples:

Mar Test

Coatings irradiated with ultraviolet radiation were tested to see whether sufficient curing had occurred by doing a Mar Test in which the surface was rubbed using a cotton-tipped applicator to see whether the surface smeared or marred. Coatings were also evaluated with a Hexane Rub and Tape Peel Test in which an area of the silicone coating was wiped using either a tissue or cotton-tipped applicator soaked with hexane, followed by a tape peel test in which a strip of 810 MAGIC Tape (available from 3M Company, St. Paul, Minn.) or masking tape was applied to the wiped area and the release level observed as the tape was peeled away. Exposed coatings were considered "cured" if they were mar-free after the Mar Test and showed good release properties following the Hexane Rub and Tape Peel Test. Curing implies that the coatings polymerized, crosslinked, or underwent a combination of both. The tape peel test also provided an indication of the adhesion of the exposed coating to the substrate.

Loop Tack Test

A qualitative measure of cure was provided by contacting an approximately 10 cm strip of a KRATON (Shell Oil Co., Houston, Tex.) adhesive coated tape having a polyurethane LAB so as to provide a silicone-free adhesive surface. The adhesive was applied to the surface of the release coating being tested and removed three successive times in three different locations. The test tape was then folded back on itself bringing one adhesive surface in contact with another adhesive surface. If the silicone surface was adequately cured, the adhesive surfaces bonded together resulting in delamination of the adhesive from the tape backing when peeled apart. In the event of unacceptable silicone transfer, no bonding occurred between the adhesive surfaces.

Release Test

Adhesives were applied to the cured release surface using both a "Dry Lamination" and "Wet-Cast" procedure. For the Dry Lamination samples, a 50 micrometer (2.0 mil) primed PET film (product 3SAB from Mitsubishi Polyester Film, Inc., Greer, S.C.) was adhered to the transfer adhesive and pulled off to create the test samples. The adhesive side of the tape was then dry laminated onto the cured silicone coating of each sample using two passes of a 2 kg rubber roller. For the Wet Cast samples, the adhesives were cast directly on the cured silicone release layers of the examples and cured with ultraviolet radiation. A 50 micrometer (2.0 mil) primed PET film (PET 3) was then laminated to the cured adhesive to form the test samples.

The peel adhesion value was a measure of the force required to pull the adhesive tape from the release at an angle of 180° at a rate of 30.5 cm/min (12 inches/minute). The IMass model SP2000 peel tester (IMASS Corp., Accord, Mass.) was used to record the peel adhesion value.

Re-Adhesion Test

To determine the Re-adhesion value, PET-backed tape samples were peeled from the liner using the Release Test method and the tape was then applied to the surface of a clean stainless steel panel. The tape sample was rolled down against the panel by means of two passes with a 2 kg rubber roller at 61 cm/min (24 inches/min). The Re-adhesion value was a measure of the force required to pull the tape from the steel surface at an angle of 180° at a rate of 30.5 cm/min (12 inches/minute). The IMass model SP2000 peel tester (IMASS Corp., Accord, Mass.) was used to record the peel force.

Silicone Coating Weight

Silicone coating weight was measured using an X-ray Fluorescence Analyzer (Model LAB-X3500, Oxford Instruments, Abingdon, UK). Direct readings were converted to actual coating weights (g/m$^2$) by applying a correction factor provided by the acrylated polysiloxane manufacturer to compensate for the varying amounts of silicon in the different formulations evaluated.

Extractables

Extractables (EXTR) were measured after curing the samples to determine how much uncured material can be removed from the samples after soaking in a specific solvent. Silicone coating weight was measured using an X-ray Fluorescence Analyzer (Model LAB-X3500, Oxford Instruments, Abingdon, UK) before ("pre") and after ("post") each cured material was soaked in solvent. The solvent used was Methyl Isobutyl Ketone (MIBK) and each sample soaked for 5 minutes in solvent and then dried for 1 hour before the "post" measurement was taken. Extractables were reported as % coat weight lost.

Silicone Transfer

A KRATON (product of Shell Oil Co., Houston, Tex.) based adhesive test tape was laminated to the release coating prior to winding into roll form. The test tape used a non-silicone LAB to eliminate any contact with a silicone surface prior to the test. After allowing the test tape to dwell in contact with the release coating for a minimum of twelve hours, the tape was removed and evaluated using Electron Spectroscopy for Chemical Analysis (ESCA) using a takeoff angle of 40°. The intensity of the silicon ESCA signal was then measured. The value for a well cured release coating is less than 5 atomic percent silicon on the adhesive surface.

Coefficient of Friction

The coefficient of friction (COF) of the release surface was determined using a Slip/Peel Tester commercially available from IMASS, Inc., Accord (Hingham), MA ("IMASS") under the trade designations "Model SP-102B-3M90" and "Model SP-2000" and following the procedure based on ASTM D 1894-63, subprocedure A. An approximately 25×15 cm (10×6 inch) area of release liner was adhered to the platform of the Slip/Peel Tester such that the release layer was exposed. Care was taken to insure that the release layer was untouched, uncontaminated, flat, and free of wrinkles Both the release layer and friction sled (wrapped with 3.2 mm thick medium density foam rubber, commercially available from IMASS under the trade designation "Model SP-101038") were blown with compressed air to remove any loose debris. The friction sled was placed on the release layer and the chain attached to the sled was affixed to the force transducer of the Slip/Peel Tester. The platform of the Slip/Peel Tester was set in motion at the speed of 15 cm/min (6 in/min), thereby dragging the friction sled across the release layer surface. The instrument calculated and reported the average kinetic friction force, omitting the static friction force. The kinetic coefficient of friction was obtained by dividing the kinetic friction force by the weight of the friction sled.

Exemplary Coating and UV Radiation Curing Apparatus

Release layers were made using a commercial 5-roll coater on 15.24 cm-wide substrates and cured while nitrogen inerting at oxygen levels below 50 ppm. Short wavelength polychromatic ultraviolet radiation source(s) (e.g., low-pressure short wavelength polychromatic mercury amalgam lamps) were used to achieve curing of the release layers on the substrates. The low-pressure short wavelength polychromatic mercury amalgam lamps were warmed up for approximately ten minutes.

Comparative Example 1

A 70:30 weight blend of RC-922 and RC-711 was coated on one side of a PET film at a thickness of 0.5 micrometer. The coating was then cured in a nitrogen atmosphere using the output from three 150 W low-pressure mercury amalgam bulbs at a speed of 15.2 mpm. The cure and adherence of the coating to the substrate was tested by rubbing with a cotton-tipped applicator. No marring or streaking could be seen and the coating was not removed. When marked using a black Sharpie King Size Permanent Marker (Newell Rubbermaid Office Products, Inc., Oak Brook, Ill.), the ink beaded. The 60° gloss was measured to be 94.

The above procedure was repeated, only the coating was cured using the output from a Xeradex 172 nm excimer lamp (Model XIS 620×96, Osram GmbH, Wipperfurth, Germany) at a speed of 15.2 mpm in a nitrogen atmosphere. While the cured film was transparent and dry to the touch and ink beaded, the coating was easily removed using a cotton-tipped applicator to the extent that a subsequent ink mark on the rubbed area would not bead. The 60° gloss was 103.

Comparative Example 2

The procedure of Comparative Example 1 was repeated but the coating weight was approximately double. While the sample exposed to the amalgam lamps showed little change, the excimer-exposed sample had a visual surface texture and was easily streaked when rubbed with the cotton-tipped applicator. Subsequent inking of the rubbed area still showed some tendency to bead indicating the presence of some silicone on the substrate consistent with incomplete cure and poor UV penetration. The 60° gloss readings were 100 for the coating exposed to the amalgam bulbs and 33 for the excimer-exposed coating, indicating a significant drop in gloss with the excimer sample due to the increased texture from surface shrinkage.

Example 1

A blend consisting of 70 wt. % RC-902, a silicone acrylate with a high silicone to acrylate ratio, and 30 wt. % RC-711, a silicone acrylate with a low silicone to acrylate ratio, both available from Evonik North America (Parsippany, N.J.) was coated onto one side of a 50 micrometer thick unprimed film (PET 1) substrate to give a wet coating thickness of less than 1.0 micrometer. The coated film was then exposed to the output of three 150 W low-pressure mercury amalgam lamps, with a peak intensity at 185 nm, manufactured by Heraeus Noblelight (Hanau, Germany) in a nitrogen atmosphere at a speed of 15.2 meters per minute (mpm). The cured coating showed good adhesion to the substrate, was dry to the touch and was mar-free after rubbing with a cotton-tipped applicator. A loop tack tape test showed no significant silicone transfer. Aged peel adhesion values measured after 8 days in a high heat-humidity environment (90° C., 90% relative humidity (RH)) are listed in Table II.

Example 2

The procedure of Example 1 was repeated with a coating comprising 70 wt. % of RC-719 and 30 wt. % of RC-711. The cured coating showed good adhesion to the PET 1 substrate, was dry to the touch and was mar-free after rubbing with a cotton-tipped applicator. A loop tack tape test showed no significant silicone transfer. Release properties for Dry Lamination and Wet Cast measured after 8 days in a controlled high heat-humidity environment (90° C., 90% RH) are listed in Table II.

Example 3

The procedure of Example 1 was repeated, except that the coating was a 70:30 (w/w) blend comprising 70 wt. % RC-922, a silicone acrylate with a high silicone to acrylate ratio, and 30 wt. % of RC-711. The cured coating showed good adhesion to the PET 1 substrate, was dry to the touch and was mar-free after rubbing with a cotton-tipped applicator. A loop tack tape test showed no significant silicone transfer. Release properties for Dry Lamination and Wet Cast measured after 8 days in a controlled and a high heat-humidity environment (90° C., 90% RH) are listed in Table II.

Example 4

The procedure of Example 1 was repeated only a commercial unprimed polycoated Kraft paper (PCK 1) was the substrate. The cured coating showed good adhesion to the substrate, was dry to the touch and was mar-free after rubbing with a cotton-tipped applicator. A loop tack tape test showed no significant silicone transfer. Release properties for Dry Lamination and Wet Cast measured after 8 days in a controlled and a high heat-humidity environment (90° C., 90% RH) are listed in Table II.

Example 5

The procedure of Example 1 was repeated only the substrate was a corona-treated PET 2 film substrate. The cured coating showed good adhesion to the substrate, was dry to the touch and was mar-free after rubbing with a cotton-tipped applicator. A loop tack tape test showed no significant silicone transfer. Release properties for Dry Lamination and Wet Cast measured after 8 days in a controlled and a high heat-humidity environment (90° C., 90% RH) are listed in Table II.

Example 6

The procedure of Example 1 was repeated. The solution comprised a blend of 70 wt. % RC902 and 30 wt. % RC711 with 0.1 wt. % DAROCUR 1173 photoinitiator. The coating thickness was less than 0.5 micrometer. The cured coating showed good adhesion to the substrate, was dry to the touch and was mar-free after rubbing with a cotton-tipped applicator. A loop tack tape test showed no significant silicone transfer. Release properties for Dry Lamination and Wet Cast measured after 8 days in a controlled and a high heat-humidity environment (90° C., 90% RH) are listed in Table II.

Example 7

The procedure of Example 6 was repeated only the blend contained 0.5 wt. % DAROCUR 1173 photoinitiator. The cured coating showed good adhesion to the PET 1 substrate, was dry to the touch and was mar-free after rubbing with a cotton-tipped applicator. A loop tack tape test showed no significant silicone transfer. Release properties for Dry Lamination and Wet Cast measured after 8 days in a controlled and a high heat-humidity environment (90° C., 90% RH) are listed in Table II.

Examples 8-17

The blends shown in Table III were coated at a thickness of less than 1.0 micrometer onto the corona-treated side of a 76.2 micrometer thick cast polypropylene (PP 1) backing Release layers were cured using one or more short wavelength polychromatic UV sources with at least 5% of UV output below 240 nm. Strips of a rubber-based adhesive tape approximately 4 cm wide by 10 cm long with a Si-free polyurethane low adhesion backsize (U-LAB) were laminated to the coating after it exited the UV chamber and before it contacted any other surface for subsequent Si transfer analysis using low angle x-ray photoelectron spectroscopy (XPS). The cure conditions and measured atomic percent Si detected on the laminate tape's adhesive surface are shown in Table III.

TABLE III (Meth)acrylate-functional Siloxane Release layers

| Ex. | Coating | Speed (mpm) | # of UV Curing Bulbs | Atomic % Si |
|---|---|---|---|---|
| 8 | 100% RC-711 | 3.1 | 3 | 2.5 |
| 9 | 100% RC-711 | 15.2 | 3 | 3.7 |
| 10 | 100% RC-711 | 15.2 | 2 | 4.7 |
| 11 | 100% RC-711 | 15.2 | 1 | 6.4 |
| 12 | 30%:70% (w/w) RC-902/RC-711 | 3.1 | 3 | 2.4 |
| 13 | 30%:70% (w/w) RC-902/RC-711 | 15.2 | 3 | 4.5 |
| 14 | 30%:70% (w/w) RC-902/RC-711 | 15.2 | 2 | 5.3 |
| 15 | 70%:30% (w/w) RC-902/RC-711 | 3.1 | 3 | 4.4 |
| 16 | 70%:30% (w/w) RC-902/RC-711 | 15.2 | 3 | 5.9 |
| 17 | 70%:30% (w/w) RC-902/RC-711 | 15.2 | 1 | 6.1 |

Examples 18-37

Release layers comprising a silicone acrylate release chemistry with no added photoinitiator but containing release-modifying particulate filler adjuvants were prepared on PET 1 substrate using the method of Example 1. AEROSIL R972 is a hydrophobic fumed silica treated with

TABLE II

8-Day Release and Re-adhesion Data (reported in N/dm)

| | Dry Lamination | | | | Wet-Cast | | | |
|---|---|---|---|---|---|---|---|---|
| Ex. | Release 25° C. | Re-Adhesion to Steel 25° C. | Release 90° C., 90% RH | Re-Adhesion to Steel 90° C., 90% RH | Release 25° C. | Re Adhesion to Steel 25° C. | Release 90° C., 90% RH | Re-Adhesion to Steel 90° C., 90% RH |
| 1 | 0.77 | 40.3 | 0.79 | 47.6 | 2.4 | 50.1 | 2.9 | 50 |
| 2 | 1.23 | 44.0 | 1.95 | 48.5 | 10.5 | 52.2 | 37.8 | 34.4 |
| 3 | 1.20 | 43.9 | 1.64 | 48.5 | 2.9 | 50.3 | 3.4 | 52.8 |
| 4 | 0.85 | 42.9 | 1.82 | 48.5 | 2.2 | 54.3 | 2.4 | 43.5 |
| 5 | 0.93 | 42.3 | 1.04 | 48.3 | 3.5 | 43.5 | 4.0 | 53.2 |
| 6 | 1.02 | 36.5 | 1.57 | 45.0 | 2.6 | 47.0 | 4.7 | 50.8 |
| 7 | 1.10 | 43.7 | 1.41 | 49.5 | 2.5 | 50.8 | 4.7 | 48.8 | dimethyldichlorosilane, AER-O-SIL R711 and AER-O-SIL R7200 are hydrophobic fumed silicas treated with methacrylsilane and AER-O-SIL 200 is a hydrophilic fumed silica, all available from Evonik. Release layers were cured as shown in Table IV and were dry to the touch, adhered well to the substrate, showed no marring and provided release greater than 1 Newton/dm.

Examples 38-41

A blend comprising 99% of RC-711 and 1% SR-351 (trimethylolpropane triacrylate) from Sartomer (Exeter, Pa.) was coated on PET 1 substrate as in Example 1 and cured as shown in Table V. Cured release layers were dry to the touch, adhered well to the substrate, showed no marring and provided release greater than 4 Newtons/dm (LAB range).

TABLE IV

Use of Optional Adjuvants in (Meth)acrylate-functional Siloxane Release layers

| Ex. | Coating | Adjuvant | Speed (mpm) | # of UV Curing Bulbs |
|---|---|---|---|---|
| 18 | RC-711 | 1% AER-O-SIL R972 | 3.1 | 3 |
| 19 | RC-711 | 1% AER-O-SIL R972 | 15.2 | 3 |
| 20 | RC-711 | 1% AER-O-SIL R972 | 15.2 | 2 |
| 21 | RC-711 | 1% AER-O-SIL R972 | 15.2 | 1 |
| 22 | RC-711 | 4% AER-O-SIL R972 | 3.1 | 3 |
| 23 | RC-711 | 4% AER-O-SIL R972 | 15.2 | 3 |
| 24 | RC-711 | 4% AER-O-SIL R972 | 15.2 | 2 |
| 25 | RC-711 | 4% AER-O-SIL R972 | 15.2 | 1 |
| 26 | RC-711 | 2% AER-O-SIL R711 | 3.1 | 3 |
| 27 | RC-711 | 2% AER-O-SIL R711 | 15.2 | 3 |
| 28 | RC-711 | 2% AER-O-SIL R711 | 15.2 | 2 |
| 29 | RC-711 | 2% AER-O-SIL R711 | 15.2 | 1 |
| 30 | RC-711 | 2% AER-O-SIL R7200 | 3.1 | 3 |
| 31 | RC-711 | 2% AER-O-SIL R7200 | 15.2 | 3 |
| 32 | RC-711 | 2% AER-O-SIL R7200 | 15.2 | 2 |
| 33 | RC-711 | 2% AER-O-SIL R7200 | 15.2 | 1 |
| 34 | RC-711 | 2% AER-O-SIL 200 | 3.1 | 3 |
| 35 | RC-711 | 2% AER-O-SIL 200 | 15.2 | 3 |
| 36 | RC-711 | 2% AER-O-SIL 200 | 15.2 | 2 |
| 37 | RC-711 | 2% AER-O-SIL 200 | 15.2 | 1 |

TABLE V

Blends of (Meth)acrylate-functional Siloxane with Non-silicone (Meth)acrylates

| Ex. | Blend | Speed (mpm) | # of UV Curing Bulbs |
|---|---|---|---|
| 38 | 1:99 SR-351/RC-711 | 3.1 | 3 |
| 39 | 1:99 SR-351/RC-711 | 15.2 | 3 |
| 40 | 1:99 SR-351/RC-711 | 15.2 | 2 |
| 41 | 1:99 SR-351/RC-711 | 15.2 | 1 |

Examples 42-46

A blend comprising 70% RC-902 and 30% RC-711 with no added photoinitiator was coated less than 1.0 micrometer thick onto the substrates listed in Table VI. Samples were cured at 15.2 mpm using three short wavelength polychromatic UV sources with at least 5% of UV output below 240 nm. Release properties for Dry Lamination and Wet Cast measured after 8 days in a controlled and a high heat-humidity environment (90° C., 90% RH) are listed in Table VI.

TABLE VI

Effect of Substrate Surface Treatment on 8-Day Release and Re-adhesion Data for (Meth)Acrylate-Functional Siloxane Release Materials

| | | | Dry Lamination | | | | Wet-Cast | | | |
|---|---|---|---|---|---|---|---|---|---|---|
| | | | Release 25° C. | Re-Adhesion to Steel 25° C. | Release 90° C., 90% RH | Re-Adhesion to Steel 90° C., 90% RH | Release 25°C. | Re-Adhesion to Steel 25°C. | Release 90°C., 90% RH | Re-Adhesion to Steel 90°C., 90% RH |
| Ex. | Substrate | Treatment | | | | | | | | |
| 42 | PET 1 | None | 0.77 | 40.2 | 0.79 | 47.6 | 2.4 | 50.1 | 2.9 | 50.0 |
| 43 | PET 2 | Corona | 0.93 | 42.3 | 1.04 | 48.3 | 3.5 | 43.5 | 4.0 | 53.2 |
| 44 | PET 2 | Primed | 0.71 | 44.6 | 0.70 | 48.7 | 1.9 | 49.3 | 2.3 | 58.1 |
| 45 | PCK 1 | None | 0.85 | 42.9 | 1.82 | 48.5 | 2.2 | 54.3 | 2.4 | 43.5 |
| 46 | PCK 2 | Corona | 0.93 | 44.6 | 1.14 | 47.4 | 2.1 | 49.2 | 2.2 | 47.6 |

Examples 47-48

Photoinitiator-free release layers of RC-711 and a 1%:99% (w/w) blend of SR-351 with RC-711 less than 1.0 micrometer thick were made on BOPP substrate and cured using three 150 W low-pressure mercury amalgam lamps at a speed of 15.2 mpm. A tackified styrene-isoprene-styrene adhesive (PSA 1) was hot melt coated onto the non-silicone side of the BOPP film to make a pressure-sensitive adhesive tape with the initial and heat aged unwind (UW) and adhesive properties shown in Table VII. C1 is a comparative example in which the silicone acrylate LAB has been replaced with a urethane Low Adhesion backsize (U-LAB).

TABLE VII

Performance of Hot Melt Adhesives with (Meth)acrylate-functional Siloxane LABs

| | | Roll UW (N/dm) | | Re-Adhesion to Steel (N/dm) | |
|---|---|---|---|---|---|
| Ex. | Coating | Initial | 14 days @ 54.4° C. (130° F.) | Initial | 14 days @ 54.4° C. (130° F.) |
| C1 | U-LAB | 7.7 | Blocked (Self-adhered) | 51.4 | Blocked (Self-adhered) |
| 47 | RC-711 | 7.9 | 12.6 | 52.5 | 48.2 |
| 48 | 1:99 SR-351/RC-711 | 6.9 | 12.0 | 51.4 | 46.0 |

Examples 49-50

A 70%:30% (w/w) blend of RC902 and RC711 was coated at a thickness of less than 1.0 micrometer onto a PET 1 substrate and cured using two 150 W low-pressure mercury amalgam bulbs at a speed of 15.2 mpm in a nitrogen atmosphere. A tackified (PSA 3) and an untackified pressure-sensitive hot melt acrylic adhesive (PSA 2) were coated onto the other side to make two pressure-sensitive tapes. The PSA types and tape unwind data are given in Table VIII along with a comparative adhesive example.

TABLE VIII

Performance of Tackified Pressure Sensitive Adhesives with (Meth)acrylate-functional Siloxane LABs

| | | | Roll UW, N/dm | | |
|---|---|---|---|---|---|
| Ex. | Coating | Tackified | Initial | 7 days @ 23° C. | 3 days @ 70° C. |
| 49 | 70%:30% (w/w) RC902/RC711 | No | 0.77 | 1.00 | 1.31 |
| 50 | 70%:30% (w/w) RC902/RC711 | Yes | 1.51 | 1.16 | 2.19 |
| C2 | Standard | Yes | 0.58 | 3.86 | 1.85 |

Examples 51-60

The procedure of Example 1 was repeated. The base solution comprised a blend of 70 wt. % RC-922 and 30 wt. % RC-711. Other silicone materials were added to the base blend at 2.5 wt. %, 5 wt. % and 10 wt. %. The resulting blends were coated onto Kraft (PCK 1) substrate to give a wet coating thickness of less than 0.5 micrometer. The coated film was then exposed to the output of three 150 W low-pressure mercury amalgam lamps manufactured by Heraeus Noblelight (Hanau, Germany) in a nitrogen atmosphere at a speed of 15.2 meters per minute (mpm). Material composition, resulting extractables, coefficient of friction properties and release and re-adhesion data of the cured materials are listed in Table IX.

TABLE IX

Extractables (EXTR), Coefficient Of Friction (CoF) and Release/Re-Adhesion for (Meth)Acrylate-Functional Siloxane Release Materials

| | | | | | Wet-Cast Release/Readhesion (N/dm) | | | |
|---|---|---|---|---|---|---|---|---|
| | | | EXTR | CoF CoF | Release | Re-Adhesion to Steel | Release | Re-Adhesion to Steel |
| Ex. | Base Coating | Additive | % | (g) | 25° C. | | 90° C., 90% RH | |
| 51 | 70%:30% RC-922/RC-711 | None | 3.0 | 0.74 | 1.0 | 37.1 | 0.9 | 46.4 |
| 52 | 70%:30% RC-922/RC-711 | 2.5% DC-200-30K | 3.2 | 0.52 | 1.0 | 49.8 | 1.1 | 41.8 |
| 53 | 70%:30% RC-922/RC-711 | 5% DC-200-30K | 4.7 | 0.44 | 1.0 | 53.2 | 1.2 | 45.5 |
| 54 | 70%:30% RC-922/RC-711 | 10% DC-200-30K | 6.1 | 0.37 | 1.1 | 40.8 | 1.2 | 40.1 |
| 55 | 70%:30% RC-922/RC-711 | 2.5% DMS-V46 | 1.6 | 0.60 | 1.1 | 55.6 | 1.1 | 38.9 |
| 56 | 70%:30% RC-922/RC-711 | 5% DMS-V46 | 2.3 | 0.55 | 0.8 | 51.2 | 1.1 | 51.0 |
| 57 | 70%:30% RC-922/RC-711 | 10% DMS-V46 | 2.3 | 0.49 | 0.9 | 41.3 | 0.9 | 47.7 |
| 58 | 70%:30% RC-922/RC-711 | 5% DC-7035 | 7.3 | 0.68 | 1.2 | 49.5 | 1.1 | 44.7 |
| 59 | 70%:30% RC-922/RC-711 | 10% DC-7035 | 10.4 | 0.72 | 1.0 | 47.6 | 1.3 | 47.8 |
| 60 | 70%:30% RC-922/RC-711 | 5% TMS-803 | 7.4 | 1.16 | 1.5 | 40.2 | 1.7 | 39.2 |

Examples 61-72

The procedure of Example 1 was repeated. Two side coated liner was made. Materials were coated on the first glossy side of Kraft (PCK 1) substrate to give a wet coating thickness of less than 0.5 micrometer. The coated film was then exposed to the output of three 150 W low-pressure mercury amalgam lamps manufactured by Heraeus Noblelight (Hanau, Germany) in a nitrogen atmosphere at a speed of 15.2 meters per minute (mpm). The roll was then flipped over to coat the second matte side of the Kraft (PCK 1) substrate to give a wet coating thickness of less than 0.5 micrometer. The coated film was then exposed to the output of at least two 150 W low-pressure mercury amalgam lamps manufactured by Heraeus Noblelight (Hanau, Germany) in a nitrogen atmosphere at a speed of 15.2 meters per minute (mpm) to cure the second side. Material composition, extractables and resulting coefficient of friction properties of the cured materials are listed in Table X.

TABLE X

Extractables and Coefficient of Friction Data for Double-Sided (Meth)Acrylate-Functional Siloxane Release Materials

| Ex. | Roll # | Side | Base Coating | Extractables % | CoF CoF (g) |
|---|---|---|---|---|---|
| 61 | 1 | 1 | 70%:30% RC-902/RC-711 | 2.6 | 0.86 |
| 62 |   | 2 | 70%:30% RC-902/RC-711 | 3.8 | 0.27 |
| 63 | 2 | 1 | 60%:10%:30% RC-902/RC-709/RC-711 | 2.7 | 0.98 |
| 64 |   | 2 | 70%:30% RC-902/RC-711 | 3.5 | 0.28 |
| 65 | 3 | 1 | 57%:9.5%:28.5%:5% RC-902/RC-709/RC-711/DC-200-1K | 6.3 | 0.49 |
| 66 |   | 2 | 70%:30% RC-902/RC-711 | 3.5 | 0.26 |
| 67 | 4 | 1 | 70%:30% RC-902/RC-711 | 2.7 | 0.79 |
| 68 |   | 2 | 66.5%:28.5%:5% RC-902/RC-711/DC-200-1K | 5.6 | 0.22 |
| 69 | 5 | 1 | 57%:9.5%:28.5%:5% RC-902/RC-709/RC-711/DC-200-1K | 7.0 | 0.35 |
| 70 |   | 2 | 66.5%:28.5%:5% RC-902/RC-711/DC-200-1K | 6.9 | 0.22 |
| 71 | 6 | 1 | Silcolease UV Poly 110 | 1.7 | 1.29 |
| 72 |   | 2 | Silcolease UV Poly 110 | 3.0 | 0.38 |

Examples 73-76

Coatings comprising a base coating of a 70:30 weight blend of RC-902 and RC-711 with a non-(meth)acrylate-functional silicone additive were coated onto a 58#, corona-treated, polyethylene-coated Kraft paper (PCK, obtained from Schoeller, Inc., Pulaski, N.Y.) at a thickness of about 0.5 micrometer. Each coating was then exposed to the output of three 150 W low-pressure mercury amalgam lamps in a nitrogen atmosphere at a speed of 15.2 meters per minute. Composition, extractables, and release/readhesion data on the cured coatings are listed in Table XI.

Example 77

The procedure of Examples 72-77 was followed, except that the additive was 10% by weight of the formulation of a monofuntional non-silicone acrylate (octadecyl acrylate, ODA, Cytec Surface Specialties, Smyrna, Ga.). The extractables, release and readhesion data on the cured coatings are listed in Table XI.

TABLE XI

Extractables (EXTR) and 7-Day Release and Readhesion Data

| | | | Wet-Cast Release/Readhesion (N/dm) | | | |
|---|---|---|---|---|---|---|
| Ex. | Base Coating | Additive | EXTR % | Release 25° C. | Re-Adhesion to Steel 25° C. | Release 90° C., 90% RH | Re-Adhesion to Steel 90° C., 90% RH |
| 73 | 70%:30% RC-902/RC-711 | None | 2.5 | 0.903 | 48.16 | 0.988 | 44.22 |
| 74 | 70%:30% RC-902/RC-711 | 2.5% Silanol OHX-4070 | 1.9 | 0.961 | 44.66 | 1.085 | 40.06 |
| 75 | 70%:30% RC-902/RC-711 | 2.5% Momentive 9315 | 3.3 | 0.888 | 32.18 | 1.023 | 31.52 |
| 76 | 70%:30% RC-902/RC-711 | 1.25% Silanol OHX-4070 & 1.25% Momentive 9315 | 2.8 | 1.189 | 37.21 | 1.085 | 43.45 |
| 77 | 70%:30% RC-902/RC-711 | 10% ODA | 2.7 | 1.645 | 44.99 | 1.467 | 47.50 |

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. Furthermore, all publications, published patent applications and issued patents referenced herein are incorporated by reference in their entirety to the same extent as if each individual publication or patent was specifically and individually indicated to be incorporated by reference.

SUMMARY OF EXEMPLARY EMBODIMENTS

Various exemplary embodiments have been described, which are summarized below:

A. A method for producing an at least partially cured layer, comprising:
  a. applying a layer comprising a (meth)acrylate-functional siloxane to a major surface of a substrate; and
  b. irradiating said layer, in a substantially inert atmosphere comprising no greater than 500 ppm oxygen, with a short wavelength polychromatic ultraviolet light source having at least one peak intensity at a wavelength of from about 160 nanometers to about 240 nanometers to at least partially cure the layer, optionally wherein the layer is at a curing temperature greater than 25° C.

B. The method of embodiment A, wherein said layer is applied at a thickness of about 0.1 micrometer to about 5 micrometers prior to irradiation with said short wavelength polychromatic light source.

C. The method of any preceding embodiment, wherein said layer is applied at a thickness of about 0.4 micrometer to about 1 micrometer prior to irradiation with said short wavelength polychromatic light source.

D. The method of any preceding embodiment, wherein said at least one peak intensity is at a wavelength between about 170 nanometers to about 220 nanometers.

E. The method of embodiment D, wherein said peak intensity is at a wavelength of about 185 nanometers.

F. The method of any preceding embodiment, wherein said short wavelength polychromatic ultraviolet light source comprises at least one low pressure mercury vapor lamp, at least one low pressure mercury amalgam lamp, at least one pulsed Xenon lamp, at least one glow discharge from a polychromatic plasma emission source, or combinations thereof.

G. The method of any preceding embodiment, wherein said layer consists essentially of one or more (meth)acrylate-functional siloxane monomers.

H. The method of any one of embodiments A-F, wherein said layer consists essentially of one or more (meth)acrylate-functional siloxane oligomers.

I. The method of any one of embodiments A-F, wherein said layer consists essentially of one or more (meth)acrylate-functional polysiloxanes.

J. The method of any one of embodiments A-F, wherein said layer further comprises one or more copolymerizable materials selected from the group consisting of monofunctional (meth)acrylate monomers, difunctional (meth)acrylate monomers, polyfunctional (meth)acrylate monomers having functionality greater than two, vinyl ester monomers, vinyl ester oligomers, vinyl ether monomers, and vinyl ether oligomers.

K. The method of any one of embodiments A-F and J, wherein said layer further comprises at least one functional polysiloxane material which does not comprise a (meth)acrylate functionality.

L. The method of embodiment K, wherein said functional polysiloxane material is selected from the group consisting of a vinyl-functional polysiloxane, a hydroxy-functional polysiloxane, an amine-functional polysiloxane, a hydride-functional polysiloxane, an epoxy-functional polysiloxane, and combinations thereof.

M. The method of any one of embodiments A-L, wherein said layer further comprises at least one non-functional polysiloxane material.

N. The method of embodiment M, wherein said at least one non-functional polysiloxane material is selected from a poly(dialkylsiloxane), a poly(alkylarylsiloxane), a poly(diarylsiloxane), a poly(dialkyldiarylsiloxane), or a combination thereof, optionally wherein the non-functional polysiloxane material comprises from 0.1 wt. % to 95 wt. %, inclusive, of the at least partially cured layer.

O. The method of any preceding embodiment, wherein said layer is substantially free of an added photoinitiator.

P. The method of any preceding embodiment, wherein said layer is substantially free of an organic solvent.

Q. The method of any preceding embodiment, wherein said substantially inert atmosphere comprises no greater than 50 ppm oxygen.

R. The method of any preceding embodiment, wherein applying said layer to the surface of the substrate comprises applying a discontinuous coating.

S. The method of any preceding embodiment, wherein the substrate is selected from the group consisting of paper, poly-coated Kraft paper, supercalendered or glassine Kraft paper, a cloth backing, a nonwoven web, a metal foil, poly(ethylene terephthalate), poly(ethylene naphthalate), polycarbonate, polypropylene, biaxially-oriented polypropylene, polyethylene, polyamide, cellulose acetate, ethyl cellulose, and combinations thereof.

T. A release layer prepared using the method of any preceding embodiment, wherein said at least partially cured layer is substantially cured to produce a release layer having an unaged peel adhesion less than about 1.0 Newton per decimeter, optionally wherein the release layer is used as a surface layer in a release liner.

U. A release layer prepared using the method of any one of embodiments A-S, wherein said at least partially cured layer is substantially cured to produce a release layer having an unaged peel adhesion greater than about 4.0 Newtons per decimeter, optionally wherein the release layer is used as a low adhesion backsize (LAB) in an adhesive article.

V. An adhesive article comprising the release layer of embodiment U, and an adhesive layer opposite the release layer on a substrate, optionally wherein the adhesive layer comprises one or more adhesive selected from a pressure sensitive adhesive, a hot melt adhesive, a radiation curable adhesive, a tackified adhesive, a non-tackified adhesive, a synthetic rubber adhesive, a natural rubber adhesive, a (meth)acrylic (co)polymer adhesive, a silicone adhesive, and a polyolefin adhesive.

These and other embodiments are within the scope of the following claims.

What is claimed is:

1. A method for producing an at least partially cured layer, comprising:
    applying a layer comprising a (meth)acrylate-functional siloxane and at least one non-functional polysiloxane material to a major surface of a substrate, wherein the layer is substantially free of added catalysts; and
    irradiating said layer, in a substantially inert atmosphere comprising no greater than 500 ppm oxygen, with a short wavelength polychromatic ultraviolet light source having at least one peak intensity at a wavelength of from about 160 nanometers to about 240 nanometers to at least partially cure the layer, optionally wherein the layer is at a curing temperature greater than 25° C.

2. The method of claim 1, wherein said at least one peak intensity is at a wavelength between about 170 nanometers to about 220 nanometers.

3. The method of claim 2, wherein said peak intensity is at a wavelength of about 185 nanometers.

4. The method of claim 1, wherein said short wavelength polychromatic ultraviolet light source comprises at least one low pressure mercury vapor lamp, at least one low pressure mercury amalgam lamp, at least one pulsed Xenon lamp, at least one glow discharge from a polychromatic plasma emission source, or combinations thereof.

5. The method of claim 1, wherein said (meth)acrylate-functional siloxane is one or more (meth)acrylate-functional siloxane monomers.

6. The method of claim 1, wherein said (meth)acrylate-functional siloxane is one or more (meth)acrylate-functional siloxane oligomers.

7. The method of claim 1, wherein said (meth)acrylate-functional siloxane is one or more (meth)acrylate-functional polysiloxanes.

8. The method of claim 1, wherein said layer further comprises one or more copolymerizable materials selected from the group consisting of monofunctional (meth)acrylate monomers, difunctional (meth)acrylate monomers, polyfunctional (meth)acrylate monomers having functionality greater than two, vinyl ester monomers, vinyl ester oligomers, vinyl ether monomers, and vinyl ether oligomers.

9. The method of claim 1, wherein said layer further comprises at least one functional polysiloxane material which does not comprise a (meth)acrylate functionality.

10. The method of claim 9, wherein said functional polysiloxane material is selected from the group consisting of a vinyl-functional polysiloxane, a hydroxy-functional polysiloxane, an amine-functional polysiloxane, a hydride-functional polysiloxane, an epoxy-functional polysiloxane, and combinations thereof.

11. The method of claim 1, wherein said at least one non-functional polysiloxane material is selected from a poly(dialkylsiloxane), a poly(alkylarylsiloxane), a poly(diarylsiloxane), a poly(dialkyldiarylsiloxane), or a combination thereof, optionally wherein the non-functional polysiloxane material comprises from 0.1 wt. % to 95 wt. %, inclusive, of the at least partially cured layer.

12. The method of claim 1, wherein said layer is substantially free of an added photoinitiator.

13. The method of claim 1, wherein said layer is substantially free of an organic solvent.

14. The method of claim 1, wherein said substantially inert atmosphere comprises no greater than 50 ppm oxygen.

15. The method of claim 1, wherein applying said layer to the surface of the substrate comprises applying a discontinuous coating.

16. The method of claim 1, wherein the substrate is selected from the group consisting of paper, poly-coated Kraft paper, supercalendered or glassine Kraft paper, a cloth backing, a nonwoven web, a metal foil, poly(ethylene terephthalate), poly(ethylene naphthalate), polycarbonate, polypropylene, biaxially-oriented polypropylene, polyethylene, polyamide, cellulose acetate, ethyl cellulose, and combinations thereof.

* * * * *

UNITED STATES PATENT AND TRADEMARK OFFICE
CERTIFICATE OF CORRECTION

PATENT NO. : 9,534,133 B2
APPLICATION NO. : 14/955151
DATED : January 3, 2017
INVENTOR(S) : Robin Wright Page 1 of 2

It is certified that error appears in the above-identified patent and that said Letters Patent is hereby corrected as shown below:

On the Title Page

Column 2
Line 3, Delete "Reserach" and insert -- Research --, therefor.
Line 8, Delete "outgasing" and insert -- outgassing --, therefor.

In the Specification

Column 1
Line 11 (approx.), After "herein" insert -- . --.

Column 7
Line 25, After "60° C." insert -- , --.

Column 10
Line 3 (approx.), After "cross-linking" insert -- . --.

Column 11
Line 23, Delete "polylsiloxane" and insert -- polysiloxane --, therefor.

Column 13
Line 45, Delete "tetr(meth)acrylate" and insert -- tetra(meth)acrylate --, therefor.

Column 14
Line 52, Delete "(Polyakyl)disiloxanes" and insert -- (polyalkyl)disiloxanes --, therefor.

Column 25
Line 20 (approx.), After "wrinkles" insert -- . --.

Signed and Sealed this
Twenty-seventh Day of June, 2017

Joseph Matal
*Performing the Functions and Duties of the
Under Secretary of Commerce for Intellectual Property and
Director of the United States Patent and Trademark Office*

Column 28
Line 6 (approx.), After "backing" insert -- . --.

Column 34
Line 39 (approx.), Delete "monofuntional" and insert -- monofunctional --, therefor.